US012750609B2

(12) United States Patent
Lim et al.

(10) Patent No.: US 12,750,609 B2
(45) Date of Patent: Sep. 29, 2026

(54) IMAGE SENSOR AND METHOD OF OPERATING THE SAME

(71) Applicant: SAMSUNG ELECTRONICS CO., LTD., Suwon-si (KR)

(72) Inventors: Dongpan Lim, Suwon-si (KR); Seongwook Song, Suwon-si (KR); Dochang Ahn, Suwon-si (KR); Jaeseong Yu, Suwon-si (KR); Tae-Shick Wang, Suwon-si (KR); Jeongguk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/062,486

(22) Filed: Feb. 25, 2025

(65) Prior Publication Data

US 2025/0350868 A1 Nov. 13, 2025

(30) Foreign Application Priority Data

May 10, 2024 (KR) ........................ 10-2024-0062078

(51) Int. Cl.

| | |
|---|---|
| ***H04N 25/78*** | (2023.01) |
| ***H04N 25/13*** | (2023.01) |
| ***H04N 25/51*** | (2023.01) |
| ***H04N 25/58*** | (2023.01) |

(52) U.S. Cl.

CPC ........... *H04N 25/78* (2023.01); *H04N 25/134* (2023.01); *H04N 25/51* (2023.01); *H04N 25/58* (2023.01)

(58) Field of Classification Search

CPC .. H04N 23/741; H04N 23/843; H04N 25/134; H04N 25/51; H04N 25/58; H04N 25/585; H04N 25/59; H04N 25/78

See application file for complete search history.

(56) References Cited

U.S. PATENT DOCUMENTS

| | | | | |
|---|---|---|---|---|
| 7,602,969 | B2 * | 10/2009 | Yamada | H04N 23/88 382/167 |
| 8,792,032 | B2 | 7/2014 | Xhakoni et al. | |
| 11,025,844 | B2 | 6/2021 | Seo et al. | |
| 11,678,082 | B2 | 6/2023 | Shim et al. | |
| 11,832,004 | B2 * | 11/2023 | Bock | H04N 25/78 |
| 11,887,282 | B2 | 1/2024 | Kim et al. | |
| 2007/0268396 | A1 * | 11/2007 | Kurane | H04N 23/73 348/E5.037 |
| 2011/0267482 | A1 * | 11/2011 | Wetzstein | H04N 23/80 382/280 |
| 2017/0026593 | A1 * | 1/2017 | Li | H04N 25/583 |
| 2023/0299099 | A1 * | 9/2023 | Lim | H10F 39/8023 |

FOREIGN PATENT DOCUMENTS

| | | |
|---|---|---|
| KR | 10 2022 0010264 A | 1/2022 |

* cited by examiner

*Primary Examiner* — Amy R Hsu

(74) *Attorney, Agent, or Firm* — Sughrue Mion, PLLC

(57) ABSTRACT

There is provided an image sensor including a pixel array including a plurality of pixels, a readout circuit that outputs first pixel data and second pixel data based on an output signal of the pixel array, and an image signal processor that generates third pixel data by restoring at least a portion of saturated pixel data of the first pixel data based on the second pixel data, and outputs the HDR image data based on the second pixel data and the third pixel data. At least a portion of the first pixel data may have a higher intensity value than the second pixel data.

20 Claims, 16 Drawing Sheets

IMAGE SENSOR AND METHOD OF OPERATING THE SAME

CROSS-REFERENCE TO RELATED APPLICATION(S)

This application is based on and claims priority under 35 USC § 119 to Korean Patent Application No. 10-2024-0062078, filed on May 10, 2024, in the Korean Intellectual Property Office, the disclosure of which is herein incorporated by reference in its entirety.

BACKGROUND

Example embodiments of the disclosure relate to a complementary metal oxide semiconductor (CMOS) image sensor, and more particularly to an image sensor generating high dynamic range (HDR) images.

An image sensor is a device that converts optical signals (e.g., incident light) into electrical signals.

Image sensors are evolving toward improving image quality in various illuminance environments by enhancing a dynamic range while decreasing a pixel size to increase resolution.

SUMMARY

Example embodiments provide an image sensor generating an HDR image with an improved signal-to-noise ratio (SNR).

According to an aspect of the disclosure, there is provided an image sensor including: a pixel array including a plurality of pixels; a readout circuit configured to output first pixel data and second pixel data based on an output signal of the pixel array; and an image signal processor configured to: generate third pixel data by restoring at least a portion of saturated pixel data of the first pixel data based on the second pixel data, and output high dynamic range (HDR) image data based on the second pixel data and the third pixel data, wherein the portion of the first pixel data has a higher intensity value than the second pixel data.

According to another aspect of the disclosure, there is provided an electronic device including: an image sensor configured to output image data based on a pixel signal output from a plurality of pixels; and a processor configured to receive the image data, and output an image based on the image data to a display device or store the image data in a storage device, wherein the image sensor includes: a readout circuit configured to output first pixel data and second pixel data based on the pixel signal; and an image signal processor configured to: generate third pixel data by restoring at least a portion of saturated pixel data of the first pixel data based on the second pixel data, and output the HDR image data based on the second pixel data and the third pixel data, the portion of the first pixel data has a higher intensity value than the second pixel data.

According to another aspect of the disclosure, there is provided a method of operating an image sensor, the method including: outputting, by a pixel array including a plurality of pixels, a pixel signal and a reset signal; outputting, by a readout circuit, first pixel data and second pixel data based on the pixel signal and the reset signal; generating third pixel data by restoring at least a portion of saturated pixel data of the first pixel data based on a color ratio between color channels of the first pixel data; and outputting high dynamic range (HDR) image data based on the second pixel data and the third pixel data, wherein the portion of the first pixel data has a higher intensity value than the second pixel data.

DETAILED DESCRIPTION

Figure 1:
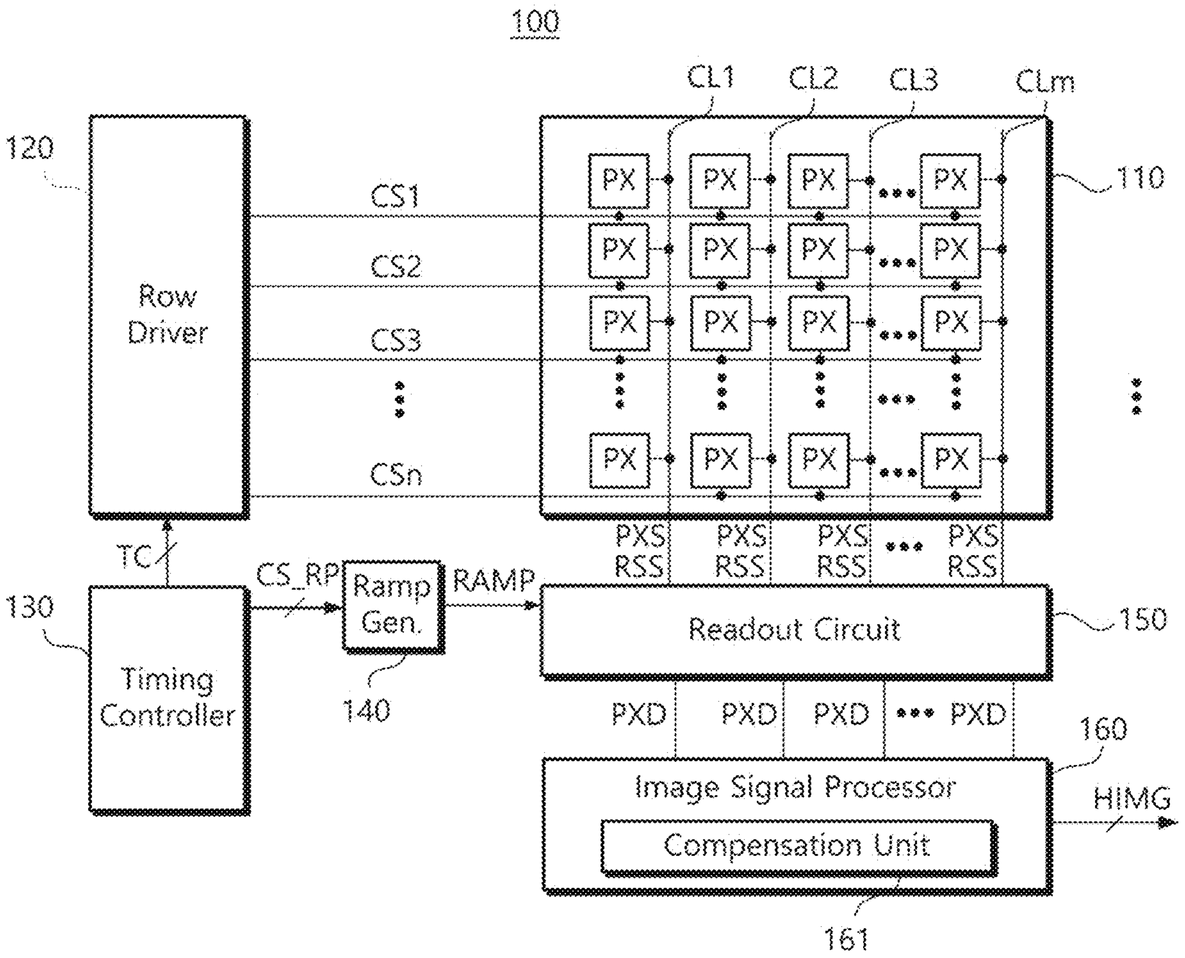
FIG. 1 is a diagram illustrating an image sensor according to one or more example embodiments.

Hereinafter, example embodiments will be described with reference to the accompanying drawings.

The following specific embodiments are provided to assist readers in obtaining a full understanding of methods, devices, and/or systems described herein. However, various changes, modifications, and equivalents of the methods, devices, and/or systems described herein will be clear upon understanding the disclosure of the present application. For example, orders of operations described herein are merely exemplary and the disclosure is not limited to those set forth herein, but rather may be altered as will be clear upon an understanding of the disclosure of the present application, except for operations that must occur in a particular order. In addition, descriptions of features known in the art may be omitted for greater clarity and brevity.

The features described herein may be implemented in different forms and should not be construed as being limited to examples described herein. Rather, the examples described herein have been provided to illustrate only some of many feasible ways of realizing the methods, devices, and/or systems described herein, many feasible ways will be clear upon an understanding of the disclosure of the present application.

The terms used herein are used only to describe various examples and will not be used to limit the disclosure. Unless the context clearly indicates otherwise, the singular form is also intended to include the plural form. The terms "comprising," "including," and "having" indicate the presence of recited features, quantities, operations, components, elements, and/or combinations thereof, but do not preclude the presence or addition of one or more other features, quantities, operations, components, elements, and/or combinations thereof.

Unless otherwise defined, all terms used herein, including technical and scientific terms, have the same meanings as those commonly understood by those of ordinary skill in the art to which the disclosure pertains after understanding the disclosure. Unless expressly so defined herein, terms (e.g., terms defined in a general-purpose dictionary) should be interpreted as having a meaning consistent with their meaning in the context of the relevant field and the disclosure, and should not be interpreted ideally or in an overly formalistic manner.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all example embodiments are not limited thereto.

The embodiments of the disclosure are example embodiments, and thus, the disclosure is not limited thereto, and may be realized in various other forms. As is traditional in the field, embodiments may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

FIG. 1 is a diagram illustrating an image sensor 100 according to one or more example embodiments.

According to an embodiment, the image sensor 100 may include an image signal processor 160. The image signal processor 160 may receive at least one pixel data and output high dynamic range (HDR) image data HIMG based on the received pixel data. The image signal processor 160 may compensate for pixel data PXD of a saturated pixel and generate HDR image data HIMG based on the compensated pixel data PXD.

The image sensor 100 will now be described in further detail with reference to FIG. 1. For example, FIG. 1 illustrates an example in which the image sensor 100 outputs pixel signals PXS in parallel for each column line. However, the disclosure is not limited thereto, and as such, the image sensor 100 may output pixels signals in another manner. For example, the image sensor 100 may be configured to output pixel signals in parallel for each pixel.

According to an embodiment, the image sensor 100 may further include a pixel array 110, a row driver 120, a timing controller 130, a ramp signal generator 140, and a readout circuit 150. The readout circuit 150 may include an analog-to-digital converter (ADC) and an output buffer. However, the disclosure is not limited thereto, and as such, according to another embodiment, the image sensor 100 may include one or more other components or omit one or more components.

The image sensor 100 may generate image data, which is visual information about an object captured through a lens. For example, the image signal processor 160 may be configured to process pixel data, received from the readout circuit 150, and output the processed pixel data to a display device or store the processed pixel data in a storage device.

The pixel array 110 may include a plurality of pixels PXs. The pixel array 110 may receive a plurality of pixel driving signals CS1, CS2, CS3 to CSn The plurality of pixel driving signals may include, but is not limited to, a select signal for controlling a select transistor, a reset signal for controlling a reset transistor, and a transfer transistor control signal for controlling a transfer transistor, from the row driver 120. Each of the plurality of pixels PXs in the pixel array 110 may operate under the control of the received pixel driving signals CS1, CS2, CS3 to CSn.

The plurality of pixels PXs may be arranged in, for example, a matrix. Each of the pixels PXs may be electrically connected to a single row line among a plurality of row lines and a single column line among a plurality of column lines. In an example embodiment, each pixel PX may include a plurality of transistors controlled by the row driver 120. In an example embodiment, two or more adjacent pixels PXs may constitute a pixel group, and two or more pixels PXs included in the pixel group may share at least a portion of a transfer transistor, a driving transistor, a select transistor, and a reset transistor.

Each of the plurality of pixels PXs may include a photoelectric conversion element converting an incident optical signal into an electrical signal. Each pixel PX may include at least one photoelectric conversion element.

The photoelectric conversion element may be a photodiode PD. The photoelectric conversion element may include, but is not limited to, a photodiode PD, a photocapacitor, a photogate, a pinned photodiode PPD, a partially pinned photodiode, an organic photodiode OPD, a quantum dot QD, or combinations thereof. Example embodiments will be provided for an example in which the photoelectric conversion element is a photodiode PD, but the above-described other photoelectric conversion elements may be used and example embodiments are not limited to a photodiode PD.

The row driver 120 may drive a single row or a plurality of rows of the pixel array 110 under the control of the timing controller 130. For example, the row driver 120 may drive at least one of the plurality of rows. The row driver 120 may generate a select signal to drive at least one of the plurality of rows. The row driver 120 may activate pixels corresponding to the selected row. A pixel signal PXS and/or a reset signal RSS of pixels in the selected row may be transmitted to the readout circuit 150 through a plurality of column lines CL1, CL2, CL3 to CLm.

The pixel signal PXS may be a voltage of a floating diffusion region. The pixel signal PXS may be a signal reflecting charges generated in the photodiodes PDs included in each of the plurality of pixels. The reset signal RSS may be a voltage of a floating diffusion region used as a reference voltage to perform correlated double sampling (CDS) together with the pixel signal PXS.

The timing controller 130 may control the pixel array 110, the row driver 120, the ramp signal generator 140, and the readout circuit 150. The timing controller 130 may provide a timing control signal TC to the row driver 120.

The timing control signal TC according to an example embodiment may be set to be different based on an operation mode of the image sensor 100. For example, the image sensor 100 may operate in a general capturing mode or an HDR mode. The operation mode of the image sensor 100 may be selected by a user or set based on conditions preset by an external processor.

The row driver 120 may drive each of the plurality of pixels PXs in a general capturing mode or an HDR mode based on the timing control signal TC.

In an example case in which the image sensor 100 operates in an HDR mode based on exposure time, the row driver 120 may drive each of the plurality of pixels PXs to generate at least two types of pixel signals PXS having different exposure times. For example, the row driver 120 may control each of the plurality of pixels PXs to generate a second pixel signal corresponding to a second exposure time, and then control each of the plurality of pixels PXs to generate a first pixel signal corresponding to a first exposure time. The first exposure time and the second exposure time may be different from each other. The first exposure time may be longer or shorter than the second exposure time.

In an example case in which the image sensor 100 operates in an HDR mode based on conversion gain, the row driver 120 may drive each of the pixels PXs to output pixel signals PXS and/or reset signals RSS based on a plurality of conversion gains. The image sensor 100 may operate based on intra-scene dual conversion gain (iDCG), which outputs a single frame image based on the plurality of conversion gains. For example, the row driver 120 may control a pixel PX to generate a pixel signal PXS and/or a reset signal RSS by applying a high conversion gain (HCG) to the voltage of the floating diffusion region, or to generate a pixel signal PXS and/or a reset signal RSS by applying a low conversion gain (LCG) to the voltage of the floating diffusion region. For example, a conversion gain greater than a first value may be considered as high conversion gain and a conversion gain less than a second value may be considered as low conversion gain. The first value and the second value may be same value. The pixel PX may output a first pixel signal and a first reset signal applied with a high conversion gain, and a second pixel signal and a second reset signal applied with a low conversion gain.

The timing controller 130 may control the ramp signal generator 140 through a ramp control signal CS_RP. The ramp control signal CS_RP may include a ramp enable signal, a mode signal, or the like.

The ramp signal generator 140 may generate a ramp signal RAMP based on to a ramp control signal CS_RP. For example, the ramp signal generator 140 may generate a ramp signal RAMP in response to a ramp control signal CS_RP. The ramp signal generator 140 may generate a ramp signal RAMP having a slope. For example, the ramp signal generator 140 may generate a ramp signal RAMP having a predetermined slope. The ramp signal generator 140 may provide the generated ramp signal RAMP to the ADC of the readout circuit 150.

The ADC of the readout circuit 150 may output the pixel signal PXS based on the ramp signal RAMP and output pixel data PXD, a digital signal, based on the pixel signal PXS and reset signal RSS. For example, the ADC may convert each of the pixel signal PXS and reset signal RSS into a digital signal based on the ramp signal RAMP in a correlated double sampling scheme, and may output a difference between the pixel signal PXS and the reset signal RSS as the pixel data PXD, the digital signal. The pixel data PXD may be provided to the image signal processor 160. The pixel data PXD may be an intensity value corresponding to the pixel signal PXS.

According to an example embodiment, the image signal processor 160 may output HDR image data HIMG based on first pixel data and second pixel data output by the readout circuit 150.

In an example case in which the image sensor 100 operates in an HDR mode based on exposure time, the readout circuit 150 may output first pixel data and second pixel data based on the first pixel signal and second pixel signal output by the pixel array 110, respectively. For example, the readout circuit 150 may output first pixel data based on the first pixel signal corresponding to the first exposure time. The readout circuit 150 may output second pixel data based on the second pixel signal corresponding to the second exposure time. The first exposure time and the second exposure time may be different from each other, and the first exposure time may be longer or shorter than the second exposure time.

In an example case in which the image sensor 100 operates in an HDR mode based on conversion gain, the readout circuit 150 may apply correlated double sampling to the first pixel signal and first reset signal applied with a high conversion gain (HCG), and output the first pixel data. In addition, the readout circuit 150 may apply correlated double sampling to the second pixel signal and second reset signal applied with a low conversion gain (LCG), and output the second pixel data. The following description of example embodiments will be provided for an example in which the first pixel data is pixel data based on the first exposure time or pixel data based on the high conversion gain (HCG). In addition, the following description of example embodiments will be provided for an example the second pixel data is pixel data based on the second exposure time or pixel data based on the low conversion gain (LCG). In addition, the following description of example embodiments will be provided for an example in which the first exposure time and the second exposure time are different from each other and the first exposure time is longer than the second exposure time. The following description of example embodiments will be provided for an example in which the high conversion gain (HCG) is a higher conversion gain than the low conversion gain (LCG).

The image signal processor 160 may receive the first pixel data and the second pixel data. The image signal processor 160 may include a compensation unit 161 that generates third pixel data by restoring at least a portion of the first pixel data based on the second pixel data and a color ratio. The compensation unit 161 may restore at least a portion of saturated pixel data of the first pixel data. For example, the compensation unit 161 may restore all or a portion of the saturated pixel data of the first pixel data. For example, the saturated pixel data may mean that a value of pixel data is a maximum value that may be digitized by the readout circuit. The saturated pixel data may be an intensity value corresponding to a pixel signal PXS output from a saturated pixel. In this specification, the expression "restoring a saturated pixel" is used interchangeably with "restoring a value of saturated pixel data."

In an example embodiment, the restoration of saturated pixel data may refer to the restoration of pixel data associated with a specific color channel of the saturated pixel data. In an example embodiment, the color ratio may be an estimated ratio of an unsaturated color channel and a saturated color channel of the saturated pixel data. In this specification, restoration and compensation are used with the same technical meaning. Restoring the pixel data may widen a dynamic range of the intensity value of the pixel data.

The image signal processor 160 may generate HDR image data HIMG based on the second pixel data and third pixel data, and output the HDR image data HIMG. In an example embodiment, the HDR image data HIMG may be image data in which the second pixel data and third pixel data are combined into a single piece of data. In an example embodiment, the HDR image data HIMG may be image data in which the second pixel data and third pixel data is present as separate data, respectively. Merged HDR image data HIMG may be image data in which the second pixel data and third pixel data are combined into a single piece of data, or image data in which the second pixel data and third pixel data is present as separate data, respectively.

The image sensor 100 according to an example embodiment may restore at least a portion of the saturated pixel data of the first pixel data to increase an SNR of the HDR image data HIMG generated based on the first pixel data and second pixel data.

Figure 2:
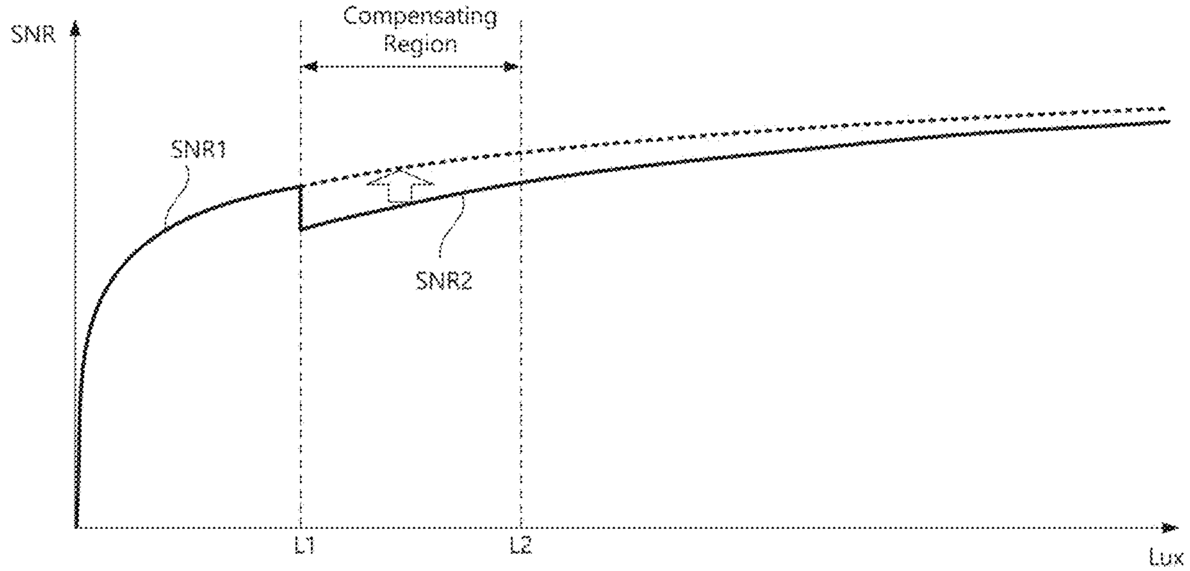
FIG. 2 is a diagram illustrating the variation of a signal-to-noise ratio depending on illuminance of an HDR image.

FIG. 2 is a diagram illustrating the variation of a signal-to-noise ratio (SNR) depending on illuminance of an HDR image.

Referring to FIG. 2, a change in SNR of an HDR image may be understood to be a combination of a change in SNR1, which is a change in SNR based on a high conversion gain HCG, and a change in SNR2, which is a change in SNR based on a low conversion gain LCG. As the illuminance increases, a saturation ratio of pixel data based on the high conversion gain HCG may increase. For example, in an example case in which a portion of pixel signals based on the high conversion gain HCG starts to saturate from the first illuminance L1, more of the pixel signals based on high conversion gain HCG may be saturated at the second illuminance L2. As a result, a saturation ratio of pixel data may increase. Accordingly, an image sensor according to the related art may generate an HDR image using at least a portion of pixel signals based on a low conversion gain LCG in illuminances at the first illuminance L1 or higher. This may cause the SNR of the HDR image to decrease in a region of a predetermined illuminance or higher.

The image sensor 100 according to an example embodiment may restore at least a portion of the saturated pixel data of the first pixel data to restore at least a portion of the decrease in SNR of the HDR image. For example, referring to FIG. 2, the image sensor 100 may restore at least a portion of the saturated pixel data based on the second pixel data and color ratio at the first illuminance L1 at which a portion of the first pixel data based on the high conversion gain HCG starts to saturate. The image sensor 100 may prevent at least a portion of the decrease in SNR of the HDR image by restoring at least a portion of the pixel data corresponding to a region from a first illuminance L1 at which a portion of the first pixel data starts to saturate to a second illuminance L2 at which saturated pixel data cannot be restored. For example, the image sensor 100 may increase the SNR of the HDR image. In the above embodiment, the first pixel data may be pixel data based on a high conversion gain HCG or long exposure time. The second pixel data may be pixel data based on a low conversion gain LCG or short exposure time. The range of an intensity value of the first pixel data may be higher than the range of an intensity value of the second pixel data. For example, an intensity value of at least a portion of the first pixel data may be higher than an intensity value of the second pixel data.

Figure 3:
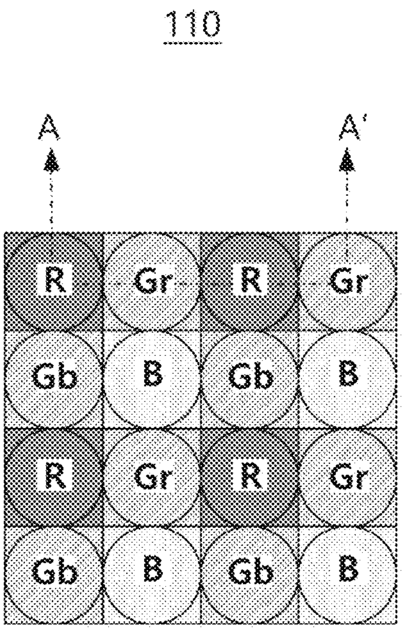
FIG. 3 is a diagram illustrating a pixel of an image sensor according to an example embodiment.

FIG. 3 is a diagram illustrating a pixel of an image sensor according to one or more example embodiments. According to the embodiment, pixels illustrated in FIG. 3 may be pixels PXs of the image sensor 100 of FIG. 1. For example, the pixels of FIG. 3 may be pixels PXs corresponding to a portion of the pixel array 110 of the image sensor 100.

In an example embodiment, the pixel array 110 may be a pixel array including pixels of different colors. For example, the pixel array may include pixels having different color filters are repeatedly arranged. The pixels having different color filters may be arranged in a Bayer pattern. Repeatedly arranged pixels PXs may include two pixels including a green color filter and provided diagonally from each other, a pixel including a red color filter, and a pixel including a blue color filter. However, the disclosure is not limited thereto, and as such, according to another embodiment, the pixels may be arranged in another pattern.

Figure 4:
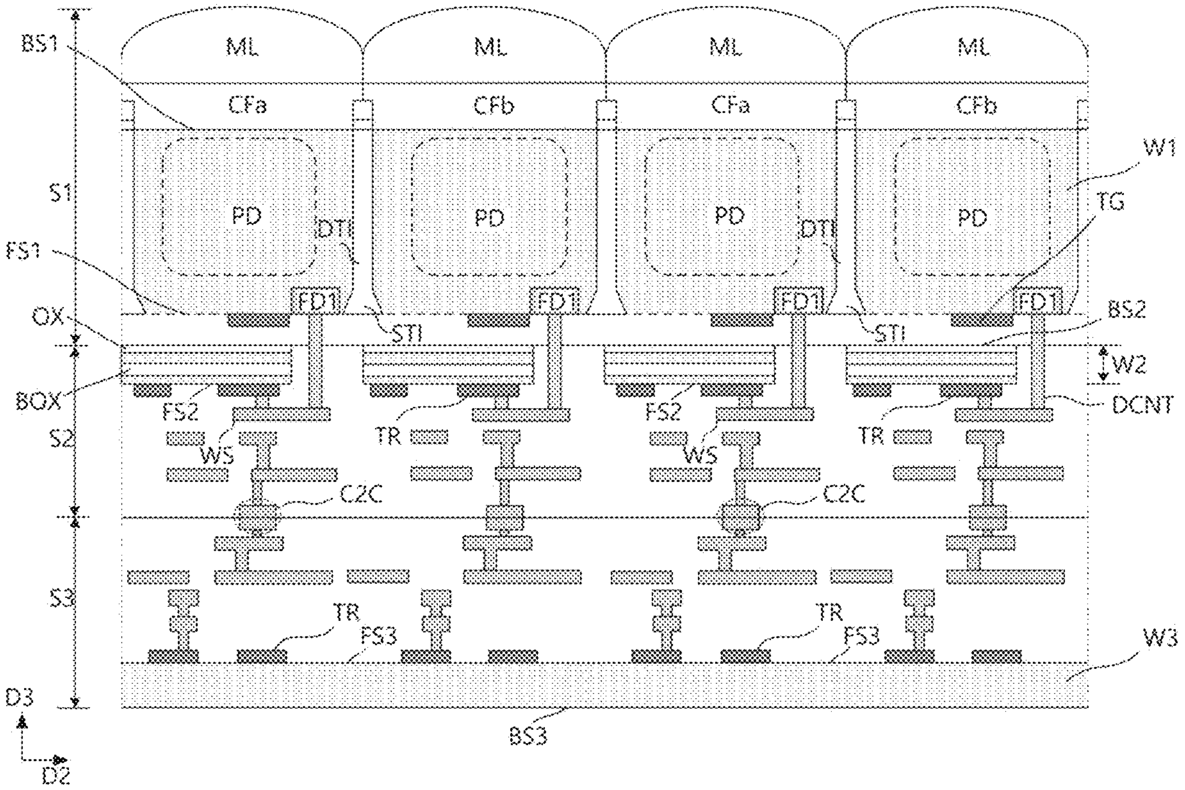
FIG. 4 is a cross-sectional view of the image sensor illustrated in FIG. 3.

FIG. 4 is a cross-sectional view of the image sensor illustrated in FIG. 3. The image sensor according to an example embodiment of FIG. 4 may be the image sensor 100 of FIG. 1. The cross-sectional view of FIG. 4 may be taken along imaginary line A-A' of the pixels PXs of the embodiment of FIG. 3.

Referring to FIG. 4, the image sensor 100 may include a first structure S1, a second structure S2, and a third structure S3.

In an example embodiment, the first structure S1 may include a photodiode PD, a transmission gate TG, and a first floating diffusion region FD1. For example, the first structure S1 may include a plurality of photodiodes PD, a plurality of transmission gates TG, and a plurality of first floating diffusion regions FD1.

In an example embodiment, pixel circuits of each pixel may be provided in the second structure S2. In another example embodiment, a portion of the pixel circuits of each pixel may be provided in the first structure S1 and another portion of the pixel circuits of each pixel may be provided in the second structure S2. For example, FIG. 4 illustrates that the first floating diffusion region FD1 of the first structure S1 is directly connected to a transistor TR of the second structure S2. However, unlike what is illustrated in FIG. 4, the first floating diffusion region FD1 of the first structure S1 may be electrically connected to the transistor TR of the second structure S2 through another pixel circuit of the first structure S1.

In an example embodiment, the second floating diffusion region may be provided in the second structure S2. The first floating diffusion region FD1 of the first structure S1 may be electrically coupled or decoupled from a second floating diffusion region of the second structure S2.

In an example embodiment, the third structure S3 may include a logic (or a logic circuit), such as a readout circuit, a timing controller, image signal processing logic, and an interface circuit.

In an example embodiment, the first structure S1, the second structure S2, and the third structure S3 may include a wiring layer WS to transmit an electrical signal.

In an example embodiment, the first structure S1 may include a first surface FS1 on a first side of the first structure S1 and a second surface BS1 on a second side the first structure S1 opposite to the first side. The first surface FS1 may be a front surface of the first structure S1, and the second surface BS1 may be a rear surface of the first structure S1. For example, the image sensor 100 may be a backside illumination type (BSI) image sensor in which light is incident on the rear surface of the first structure S1.

In an example embodiment, pixels may be provided in the first structure S1, and each of the pixels may include a photodiode PD, color filter CFa and CFb, and a microlens ML. The color filter CFa may be a red color filter, and the color filter CFb may be a green color filter.

In an example embodiment, a plurality of pixel isolation layers DTIs may be formed between a first surface FS1 and a second surface BS1 of a first substrate W1 of the first structure S1 and may extend from the second surface BS1 towards the first surface FS1. Pixels may be separated from each other by the pixel isolation layers DTIs.

In an example embodiment, the first structure S1 may include a device isolation portion STI.

In an example embodiment, the device isolation portion STI may extend from the first surface FS1 of the first substrate W1 towards the second surface BS1 to a predetermined depth and may include an insulating material. The device isolation portion STI may be connected to the pixel isolation layer DTI, and a boundary between the device isolation portion STI and the pixel isolation layer DTI may not be readily apparent.

In an example embodiment, the device isolation portion STI may be formed as a doping region extending in a direction from the first surface FS1 of the first substrate W1 towards the second surface BS1. For example, the device isolation portion STI may be formed as a doping region having a predetermined depth. The doping region may be doped with a P-type material.

In an example embodiment, the second structure S2 may include a second substrate W2.

In an example embodiment, the second substrate W2 may be a silicon-on-insulator (SOI) substrate. The SOI substrate may be bonded to the first structure S1. For example, after the SOI substrate may be bonded to the first structure S1, a portion of the SOI substrate may be ground, polished, or ion-cut to be divided. The second structure S2 may include an oxide layer OX and a buried oxide layer BOX. The second substrate W2 may be referred to as an active layer.

In an example embodiment, the second substrate W2 may not include a buried oxide layer BOX, unlike the second substrate W2 illustrated in FIG. 4. For example, the second substrate W2 may be a general semiconductor substrate, rather than an SOI substrate.

In an example embodiment, the first structure S1 and the second structure S2 may be electrically connected to each other through a deep-contact structure DCNT. The deep-contact structure DCNT may be formed as a contact intersecting at least a portion of the first structure S1 and at least a portion of the second structure S2. The deep-contact structure DCNT may be formed after bonding the first structure S1 and the second structure S2 to each other. In an example embodiment, the deep-contact structure DCNT may include an electrical connection path formed of tungsten.

In another an example embodiment, the first structure S1 and the second structure S2 may be electrically connected to each other through a through-silicon via, unlike what is illustrated in FIG. 4.

In another example embodiment, the first structure S1 and the second structure S2 may be electrically connected to each other through a Cu-to-Cu (C2C) bonding contact.

In another example embodiment, the first structure S1 and the second structure S2 may be electrically connected to each other through a Cu-to-Cu (C2C) bonding contact, a deep-contact structure DCNT, and a through-silicon via.

In an example embodiment, the second structure S2 and the third structure S3 may be electrically connected through a Cu-to-Cu (C2C) bonding contact. In another example embodiment, the second structure S2 and the third structure S3 may be electrically connected to each other through a through-silicon via and/or a through-silicon contact (TSC), unlike what is illustrated in FIG. 16B.

In an example embodiment, the first surface FS1 of the first substrate W1 and the third surface BS2 of the second substrate W2 may face each other, and the fourth surface FS2 of the second substrate W2 and the fifth surface FS3 of the third substrate W3 may face each other.

Figure 5:
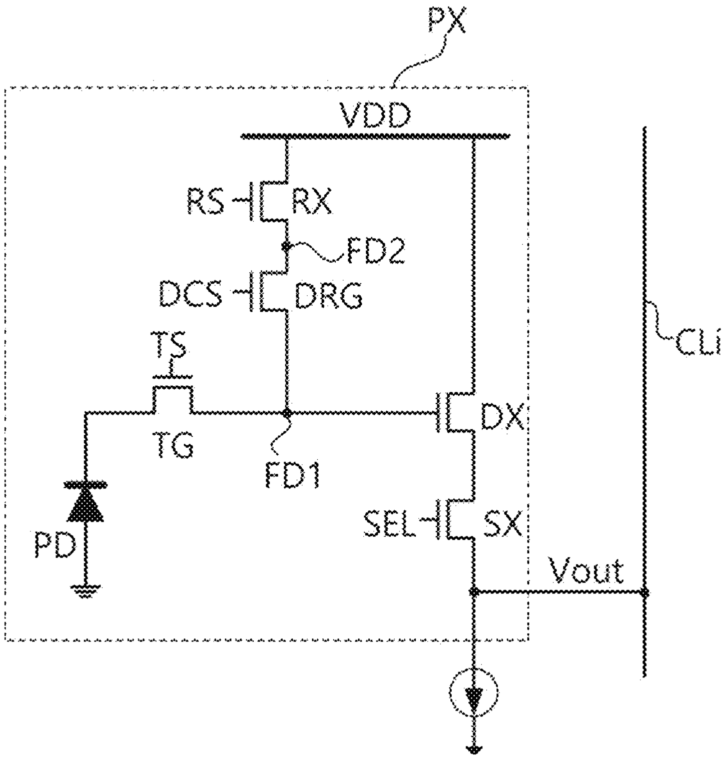
FIG. 5 is a circuit diagram illustrating a pixel of an image sensor according to one or more example embodiments.

FIG. 5 is a circuit diagram illustrating a pixel of an image sensor according to one or more example embodiments. According to an example embodiment, a pixel PX of FIG. 5 may correspond to a pixel PX of the image sensor 100 of FIG. 1. The example described with reference to FIG. 5 may be a pixel PX of an image sensor 100 that operates in HDR mode based on a conversion gain. However, the disclosure is not limited thereto, and as such, according to another embodiment, a pixel of the image sensor 100, operating in HDR mode based on exposure time, may have a circuit configuration different from a circuit configuration of the example of FIG. 5. The following embodiments will be described with respect to an example in which the image sensor 100 operates in HDR mode based on a conversion gain.

Referring to FIG. 5, a pixel PX according to an example embodiment may include a photodiode PD, a transfer transistor TG, a reset transistor RX, a driving transistor DX, a select transistor SX, and a conversion gain transistor DRG.

The transfer transistor TG may connect the photodiode PD and a first floating diffusion region FD1 and may be controlled by a transmission control signal TS.

The reset transistor RX may connect a pixel voltage power supply VDD and the first floating diffusion region FD1 and/or a second floating diffusion region FD2 and may be controlled by a reset control signal RS. One terminal of the reset transistor RX may be connected to the pixel voltage power supply VDD, and the other terminal of the reset transistor RX may be connected to the second floating diffusion region FD2.

The conversion gain transistor DRG may connect the first floating diffusion region FD1 and the second floating diffusion region FD2. The second floating diffusion region FD2 may be electrically coupled to the first floating diffusion region FD1 by turning on the conversion gain transistor DRG. The conversion gain transistor DRG may be controlled by a conversion gain control signal DCS.

The driving transistor DX may be a source follower transistor and may be controlled by a voltage of the first floating diffusion region FD1. In an example case in which the second floating diffusion region FD2 is electrically coupled to the first floating diffusion region FD1, the driving transistor DX may be controlled by the voltage of the first floating diffusion region FD1 coupled to the second floating diffusion region FD2. The driving transistor DX may provide an output signal amplified by a voltage provided to a gate terminal to one terminal of the select transistor SX.

The select transistor SX may output a signal, received from the driving transistor DX, to a column line CLi based on the control of the select signal SEL. A signal Vout, output to the column line CLi, may be a pixel signal or a reset signal.

Figure 6A:
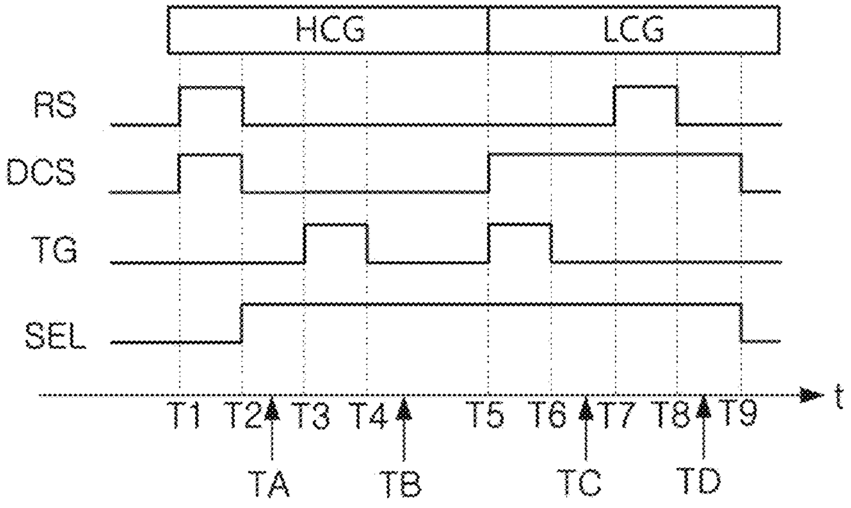
FIG. 6A is an operational timing diagram of the image sensor illustrated in FIG. 5.
Figure 6B:
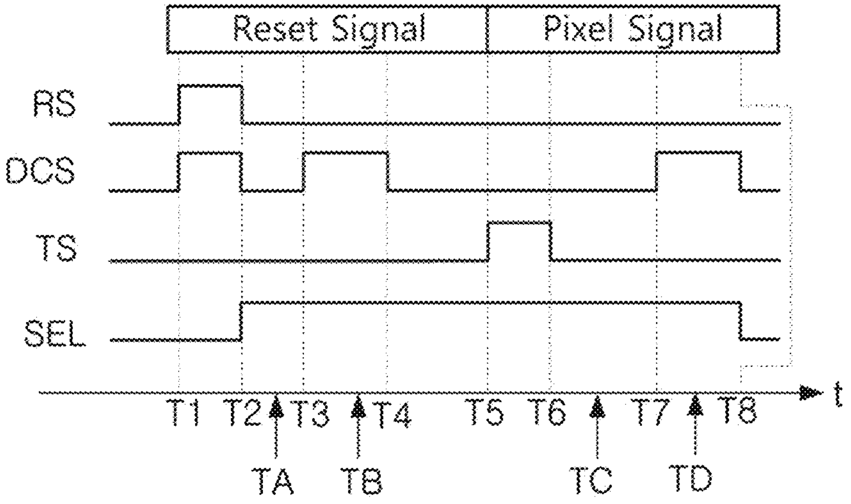
FIG. 6B is an operational timing diagram of the image sensor illustrated in FIG. 5.

FIGS. 6A and 6B are operational timing diagrams of the pixel PX of the image sensor 100 according to the example embodiment of FIG. 5.

FIG. 6A illustrates an example case in which the pixel PX of the image sensor 100 outputs a pixel signal or a reset signal in first readout mode. FIG. 6B illustrates an example case in which the pixel PX of the image sensor 100 outputs a pixel signal or a reset signal in second readout mode.

Referring to FIGS. 6A and 6B, a pixel PX according to an example embodiment may output a pixel signal or a reset signal based on a high conversion gain HCG and a low conversion gain LCG. The pixel PX may output a first pixel signal based on the high conversion gain HCG and a second pixel signal based on the low conversion gain LCG, based on photoelectric charges of a photodiode PD that are generated by light exposure of a same time period. For example, the pixel PX may output the first pixel signal based on the high conversion gain HCG and the second pixel signal based on the low conversion gain LCG, based on photoelectric charges of a photodiode PD that are generated by light exposure for a same frame. Charges generated by light exposure may be transferred to the first floating diffusion region FD1 of FIG. 5, and the first pixel signal may be output based on the charge of the first floating diffusion region FD1. Thereafter, the first floating diffusion region FD1 may be electrically coupled to the second floating diffusion region FD2 of FIG. 5, and the second pixel signal may be output based on the charge of the first floating diffusion region FD1 to which the second floating diffusion region FD2 is coupled. Accordingly, the pixel PX may operate based on an intra-scene dual conversion gain iDCG.

According to an example embodiment, the conversion gain transistor DRG of the pixel PX may be maintained in an OFF state to provide the high conversion gain HCG and maintained in an ON state to provide the low conversion gain LCG.

Referring to FIG. 6A, a pixel PX outputting a pixel signal or a reset signal in the first readout mode will now be described.

At time T1, a reset control signal RS and a conversion gain control signal DCS may transition to a high level to turn on the reset transistor RC and the conversion gain transistor DRG and reset floating diffusion regions FD1 and FD2. The transfer transistor TG may be an OFF state. At time T2, the reset transistor RC and the conversion gain transistor DRG may be turned off.

At time T2, the select transistor SX may be turned on by a high-level select signal SEL. At time TA, a first reset signal based on a high conversion gain HCG corresponding to a voltage of the first floating diffusion region FD1 may be output from the pixel PX.

At time T3, the transfer transistor TG may be turned on by a high-level transmission control signal TS, and the photoelectric charges of the photodiode PD may move to the first floating diffusion region FD1. At time T4, the transfer transistor TG may be turned off. At time TB, a first pixel signal based on a high conversion gain HCG corresponding to the voltage of the first floating diffusion region FD1 may be output from the pixel PX. Both the first pixel signal and the first reset signal may be output based on the high conversion gain HCG corresponding to the voltage of the first floating diffusion region FD1. Accordingly, the first pixel signal and the first reset signal may be associated with each other.

At time T5, the conversion gain transistor DRG may be turned on by a high-level conversion gain control signal DCS, and the second floating diffusion region FD2 may be electrically coupled to the first floating diffusion region FD1. The transfer transistor TG may be turned on again by a high-level transmission control signal TS. At time TC, a second pixel signal based on a low conversion gain LCG corresponding to the voltage of the first floating diffusion region FD1, electrically coupled to the second floating diffusion region FD2, may be output from the pixel PX.

At time T7, the reset transistor RX may be turned on by a high-level reset control signal RS while the conversion gain transistor DRG is turned on. The first floating diffusion region FD1, electrically coupled to the second floating diffusion region FD2, may be reset by the pixel voltage power supply VDD. At time T8, the reset transistor RX may be turned off by a low-level reset control signal RS. At time TD, a second reset signal based on the low conversion gain LCG may be output from the pixel PX in the first floating diffusion region FD1 electrically coupled to the second floating diffusion region FD2. Both the second pixel signal and the second reset signal may be output based on the low conversion gain LCG corresponding to the voltage of the first floating diffusion region FD1. Accordingly, the second pixel signal and the second reset signal may be associated with each other.

Referring to FIG. 6B, a pixel PX outputting a pixel signal or a reset signal in second readout mode will now be described. With regard to sections that are identical or similar to the first readout mode described in FIG. 6A, a detailed description will be omitted.

Referring to FIG. 6B, the pixel PX may output a first reset signal based on a high conversion gain HCG and a second reset signal based on a low conversion gain LCG, unlike the operation described with reference to FIG. 6A. After outputting the first reset signal and the second reset signal, the pixel PX may output a first pixel signal based on the high conversion gain HCG and a second pixel signal based on the low conversion gain LCG.

At time T1, a reset control signal RS and a conversion gain control signal DCS may transition to a high level to turn on the reset transistor RX and the conversion gain transistor DRG and reset the floating diffusion regions FD1 and FD2. The transfer transistor TG is in an OFF state. At time T2, the reset transistor RC and the conversion gain transistor DRG may be turned off.

At time T2, the select transistor SX may be turned on by a high-level select signal SEL. At time TA, a first reset signal based on a high conversion gain HCG corresponding to a voltage of the first floating diffusion region FD1 may be output from the pixel PX.

At time T3, the conversion gain control signal DCS transitions to a high level to turn on the conversion gain transistor DRG and to electrically couple the second floating diffusion region FD2 to the first floating diffusion region FD1. At time TB, a second reset signal based on the low conversion gain LCG may be output from the pixel PX in the first floating diffusion region FD1 to which the second floating diffusion region FD2 is electrically coupled.

At time T4, the conversion gain control signal DCS may transition to a low level to turn off the conversion gain transistor DRG.

At time T5, the transfer transistor TG may be turned on by a high-level transmission control signal TS, and photoelectric charges of the photodiode PD may move to the first floating diffusion region FD1. At time T6, the transfer transistor TG may be turned off. At time TC, a first pixel signal based on high conversion gain HCG corresponding to the voltage of the first floating diffusion region FD1 may be output from the pixel PX. Both the first pixel signal and the first reset signal may be output based on the high conversion gain HCG corresponding to the voltage of the first floating diffusion region FD1. Accordingly, the first pixel signal and the first reset signal may be associated with each other.

At time T7, the conversion gain control signal DCS may transition to a high level again to turn on the conversion gain transistor DRG and to electrically couple the second floating diffusion region FD2 to the first floating diffusion region FD1. At time TD, a second pixel signal based on the low conversion gain LCG may be output from the pixel PX in the first floating diffusion region FD1 to which the second floating diffusion region FD2 is electrically coupled. Both the second pixel signal and the second reset signal may be output based on the low conversion gain LCG corresponding to the voltage of the first floating diffusion region FD1 to which the second floating diffusion region FD2 is electrically coupled. Accordingly, the second pixel signal and the second reset signal may be associated with each other.

Figure 7:
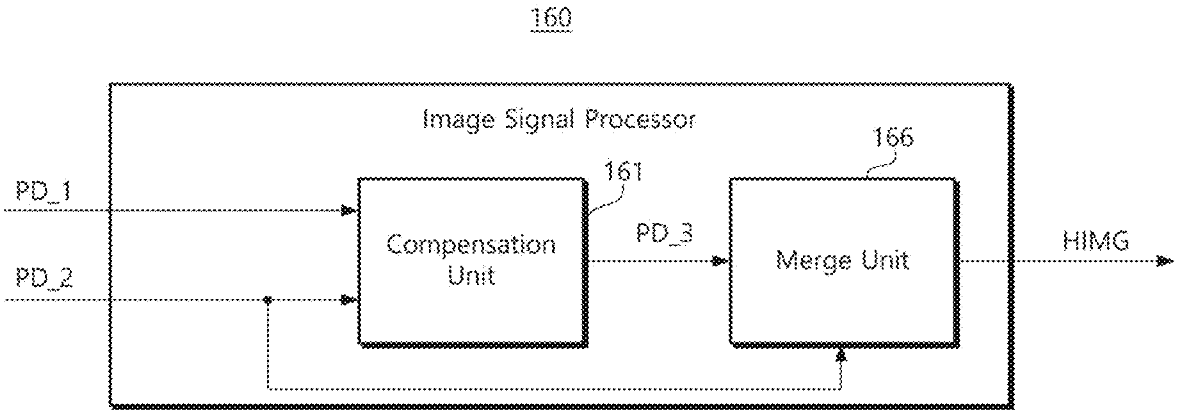
FIG. 7 is a block diagram of an image signal processor according to one or more example embodiments.

FIG. 7 is a block diagram of an image signal processor according to one or more example embodiments. The image signal processor of FIG. 7 may correspond to the image signal processor 160 of FIG. 1. The image signal processor 160 will now be described with reference to FIGS. 1 and 7.

According to an example embodiment, the image signal processor 160 may include a compensation unit 161 and a merge unit 166. However, the disclosure is not limited thereto, and as such, according to another embodiment, the image signal processor 160 may include one or more other components or omit one or more components.

The compensation unit 161 may receive first pixel data PD_1 and second pixel data PD_2 and output third pixel data PD_3. For example, the compensation unit 161 may output the third pixel data PD_3 in which at least a portion of the saturated pixel data of the first pixel data PD_1 has been restored. The compensation unit 161 may restore at least a portion of saturated pixel data of the first pixel data PD_1 based on the second pixel data PD_2 and a color ratio. The first pixel data may be pixel data based on a high conversion gain HCG or a long exposure time. The second pixel data may be pixel data based on a low conversion gain LCG or a short exposure time.

The first pixel data PD_1 may be a signal output by a readout circuit 150 that has received the first pixel signal and the first reset signal based on high conversion gain HCG described with reference to FIG. 6B. The second pixel data PD_2 may be a signal output by the readout circuit 150 that has received a second pixel signal and a second reset signal based on low conversion gain LCG described with reference to FIG. 6B.

In an example embodiment, noise removal processing may be performed on the second pixel data PD_2 before being input to the compensation unit 161. The noise-removed second pixel data PD_2 may be provided to the compensation unit 161 and the merge unit 166.

In an example embodiment, the second pixel data PD_2 may be normalized before being input to the compensation unit 161. For example, the second pixel data PD_2 may be normalized based on the first pixel data PD_1. For example, intensity values of the second pixel data PD_2 may be amplified by a ratio of high conversion gain HCG to low conversion gain LCG (HCG/LCG). In another example embodiment, the second pixel data PD_2 may be normalized based on a dynamic range of the intensity values of the first pixel data PD_1.

The pixel data PD_1 and PD_2 may be digital signals based on pixel signals, which are analog values output from a pixel PX. The pixel data PD_1 and PD_2 may have intensity values, which are digital signals.

The merge unit 166 may output HDR image data HIMG based on the second pixel data PD_2, and the third pixel data PD_3 in which at least a portion of the saturated pixel data has been restored. The second pixel data PD_2 may be normalized pixel data.

In an example embodiment, the merge unit 166 may output HDR image data HIMG in which the second pixel data and the third pixel data are combined into a single piece of data. For example, the merge unit 166 may generate HDR image data HIMG based on a value obtained by multiplying the intensity values of the second pixel data PD_2 by a first weight and a value obtained by multiplying the intensity values of the third pixel data PD_3 by a second weight. The first weight and the second weight may be predetermined values.

In an example case in which the first weight is set to a value "a" between 0 and 1, the second weight may be set to "1-a." In another example embodiment, the first weight may be 0 or 1, and the second weight may be 1 or 0. In an example case in which the intensity value of the third pixel data PD_3 is an unsaturated value or a value restored from saturation, the first weight may be 0 and the second weight may be 1. In an example case in which the intensity value of the third pixel data PD_3 is saturated and unrestored, the first weight may be 1 and the second weight may be 0.

In an example embodiment, the merge unit 166 may output HDR image data HIMG in which the second pixel data and the third pixel data are present as separate data. For example, the merge unit 166 may output the second pixel data and the third pixel data alternately or in parallel.

Although FIG. 7 illustrates an example embodiment in which the HDR image data HIMG is output by the merge unit 166 by combining the second pixel data and the third pixel data, the disclosure is not limited thereto, and as such, according to another embodiment, the merge unit 166 may output HDR image data HIMG using various merging methods based on the second pixel data PD_2, and the third pixel data PD_3 in which at least a portion of the saturated pixel data has been restored.

In an example case in which each of the second pixel data and the third pixel data is demosaiced pixel data, the merge unit 166 may demosaic the second pixel data and the third pixel data and then merge the demosaiced first and second pixel data. In another example embodiment, the merge unit 166 may merge the second pixel data and the third pixel data and then demosaic the merged first and second pixel data. The HDR image data HIMG may be mosaiced image data.

Figure 8:
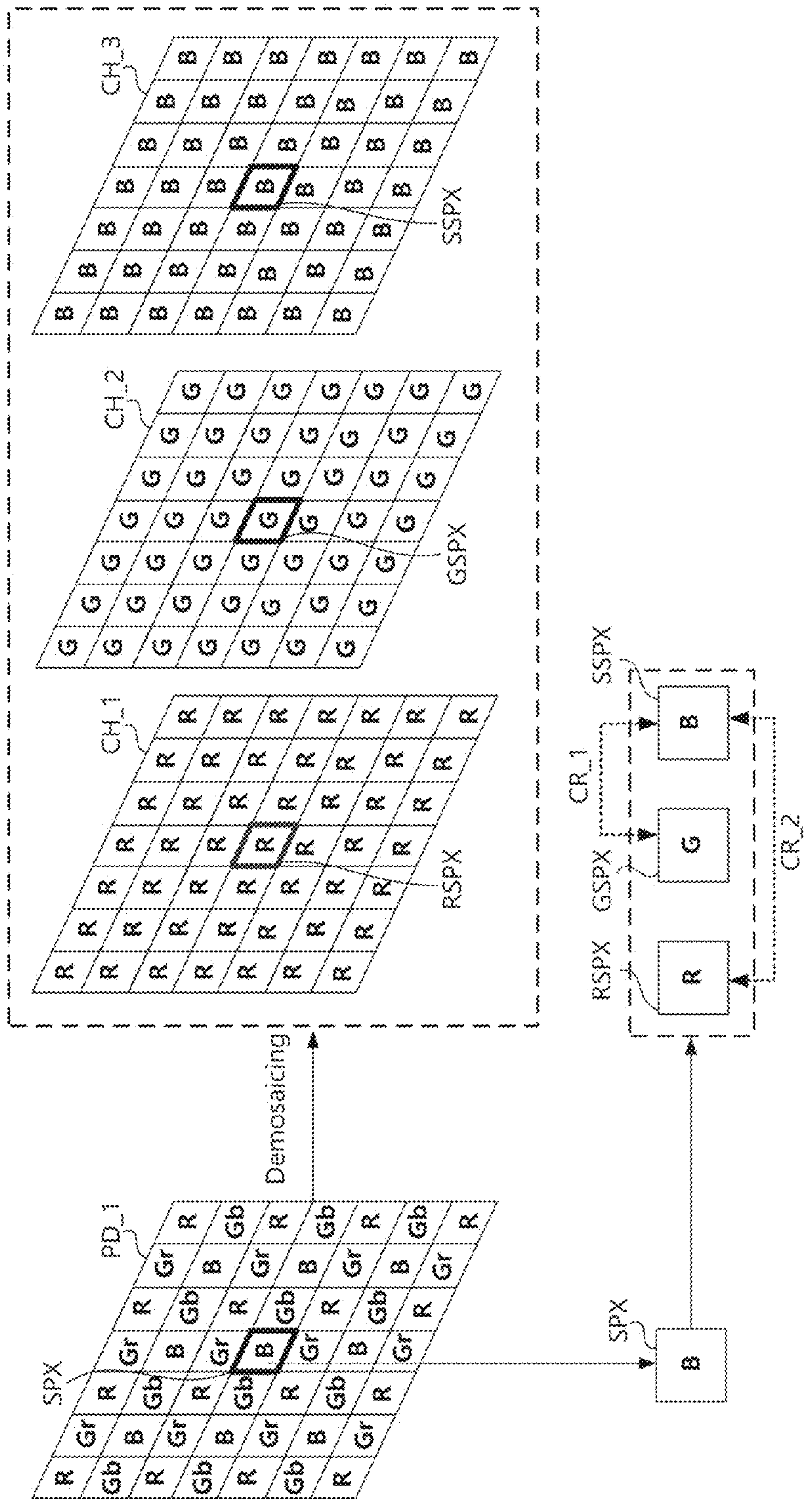
FIG. 8 is a conceptual diagram illustrating a process of restoring saturated pixels by an image signal processor according to one or more example embodiments.

FIG. 8 is a conceptual diagram illustrating a process of restoring saturated pixels by an image signal processor according to one or more example embodiments. The restoration of saturated pixels described with reference to FIG. 8 may be performed by the image signal processor 160 of FIGS. 1 to 7. The compensation unit 161 of FIG. 7 may perform the restoration of saturated pixels. The restoration of saturated pixels, performed by the compensation unit 161, will now be conceptually described with reference to FIGS. 7 and 8.

Referring to FIG. 8, the compensation unit 161 may restore an intensity value of a saturated pixel SPX of the first pixel data PD_1 based on at least one of a first color ration CR1 and a second color ratio CR2. The example embodiment of FIG. 8 is described with respect to an example in which the saturated pixel SPX is a pixel including a blue color filter. However, the disclosure is not limited thereto, and as such, restoring a pixel is used interchangeably with restoring an intensity value of pixel data based on a pixel signal output from the pixel. For example, the saturated pixel SPX may be a pixel including a red color filter or a green color filter.

In an example embodiment, the first pixel data PD_1 may be input to the compensation unit 161, in which, each unit may be stored in line memories. For example, FIG. 8 illustrates 7×7 first pixel data PD_1 stored in seven line memories, but example embodiments are not limited thereto.

The compensation unit 161 may demosaic the first pixel data PD_1 to generate subpixels RSPX, GSPX, and SSPX corresponding to the saturated pixel SPX. The subpixels RSPX and GSPX may correspond to a red color channel and a green color channel, respectively. The subpixels RSPX and GSPX may be generated by demosaicing based on intensity values of neighboring pixels of the saturated pixel SPX. The intensity value of the blue subpixel SSPX may be the same as the intensity value of the saturated pixel SPX. For example, the intensity value of the subpixel SSPX corresponding to the color filter of the saturated pixel SPX may be the same as the intensity value of the saturated pixel SPX.

Color channels may correspond to color filters. For example, there may be color channels corresponding to the color filters included in the pixels PXs of the pixel array 110 of FIG. 1. In an example case in which the pixels PXs include red color filters, green color filters, and blue color filters according to the Bayer pattern of FIG. 3, red subpixels of the red color channel, green subpixels of the green color channel, and blue subpixels of the blue color channel may be generated by demosaicing.

Example embodiments are based on the discovery that color channels of an image sensor are saturated to be different for each color channel depending on a light source and a subject. For example, even when a single color channel is saturated, information on the saturated color channel may remain in the other color channels. Therefore, according to example embodiments, saturated color channels may be restored based on a color ratio that is a relationship between the color channels.

Referring to FIG. 8, in an example embodiment, the color ratio may be a ratio of intensity values of subpixels RSPX, GSPX, and SSPX corresponding to a saturated pixel SPX corresponding to color channels CH_1, CH_2, and CH_3. For example, the first color ratio CR_1 may be a ratio of an intensity value of an unsaturated blue subpixel to an intensity value of the green subpixel GSPX. The second color ratio CR_2 may be a ratio of an intensity value of the unsaturated blue subpixel to an intensity value of the red subpixel RSPX.

In an example embodiment, the restoration of the intensity value of the blue subpixel SSPX, which is a subpixel corresponding to the color filter of the saturated pixel SPX, may be performed based on the following Equation 1.

Estimated intensity value of SSPX=first coefficient×CR_1×intensity value of GSPX+second coefficient×CR_2×intensity value of RSPX <Equation 1>

In an example embodiment, the estimated value may be used as intensity value of the unsaturated blue subpixel SSPX for calculating the first color ratio CR_1 and the second color ratio CR_2. For example, the intensity value of the blue subpixel of the second pixel data corresponding to the saturated pixel SPX of the first pixel data PD_1 may be estimated as an intensity value of the unsaturated blue subpixel.

In an example embodiment, the estimated value may be used as an intensity value of the unsaturated blue subpixel, an intensity value of the green subpixel, and an intensity value of the red subpixel for calculating the first color ratio CR_1 and the second color ratio CR_2. For example, the first color ratio CR_1 and the second color ratio CR_2 may be calculated using the intensity values of the blue subpixel, green subpixel, and red subpixel of the second pixel data corresponding to the saturated pixels SPX of the first pixel data PD_1.

In an example embodiment, the intensity values of the subpixels used to calculate the first color ratio CR_1 and the second color ratio CR_2 may be values to which a low-pass filter has been applied. For example, the intensity values may be intensity values that have been subjected to blurring processing. For example, the intensity value of each of the green subpixel GSPX of the first pixel data and the blue subpixel of the second pixel data may be used to calculate the first color ratio CR_1 after the blurring processing. Additionally, the intensity value of each of the red subpixel RSPX of the first pixel data and the blue subpixel of the second pixel data may be used to calculate the second color ratio CR_2 after the blurring processing. In an example case in which values to which a low-pass filter has been applied are used to calculate the color ratio, the intensity values of the subpixels may be employed to prevent color ratio value inaccuracy arising from anomalous local variation.

In an example embodiment, the first and second coefficients of Equation 1 may be values between 0 and 1. For example, each of the first and second coefficients may have a value of 0.5.

In an example case in which a pixel adjacent to a saturated pixel SPX of the first pixel data PD_1 is also saturated, a color channel corresponding to the saturated adjacent pixel may not be used to restore the saturated pixel SPX. In an example case in which a green pixel adjacent to the saturated pixel SPX of the first pixel data PD_1 is saturated, the first coefficient may have a value of 0. Accordingly, in an example case in which pixels adjacent to the saturated pixel SPX of the first pixel data PD_1 are all saturated, the saturated pixel SPX may not be restored. For example, in a case in which a green pixel and a red pixel adjacent to the saturated pixel SPX of the first pixel data PD_1 are saturated, the saturated pixel SPX may not be restored.

The example embodiment of FIG. 8 has been described with respect to an example in which the saturated pixel SPX of the first pixel data PD_1 is a pixel including a blue color filter. However, in an example case in which the saturated pixel is a pixel including a color filter of another color, the saturated pixel SPX may be restored based on the following Equation 2. In Equation 2, a first subpixel is a subpixel of the first color channel associated with the saturated pixel.

Estimated intensity value of first subpixel of saturated pixel=first coefficient×CR_A×intensity value of second subpixel+second coefficient×CR_B×intensity value of third subpixel <Equation 2>

In Equation 2, CR_A (color ratio A) is a ratio of the first color channel to the second color channel, and CR_B (color ratio B) is a ratio of the first color channel to the third color channel. The second color channel and the third color channel are color channels that are not associated with a saturated pixel, among color channels associated with a color filter array. In an example embodiment, a color ratio between color channels may be calculated as an intensity ratio between subpixels of the color channels. For example, the color ratio A (CR_A) may be a ratio of an intensity value of the first subpixel of the first color channel to an intensity value of the second subpixel of the second color channel. The color ratio B (CR_B) may be a ratio of the intensity value of the first subpixel of the first color channel to an intensity value of the third subpixel of the third color channel. As described above, at least a portion of the intensity values of the subpixels used to calculate the color ratio A (CR_A) and the color ratio B (CR_B) may be estimated using the intensity values of the subpixels of the second pixel data. For example, to calculate the color ratio A (CR_A) and the color ratio B (CR_B), the intensity value of the first subpixel of the first color channel may be estimated as the intensity value of the first subpixel of the first color channel of the second pixel data.

In an example embodiment, the intensity values of the subpixels used to calculate the color ratio may be values to which a low-pass filter has been applied. For example, to calculate the color ratio A (CR_A) and the color ratio B (CR_B), the intensity value of the second subpixel of the second color channel and the intensity value of the third subpixel of the third color channel may be intensity values after a low-pass filter is applied to each of the second and third subpixels.

Figure 9:
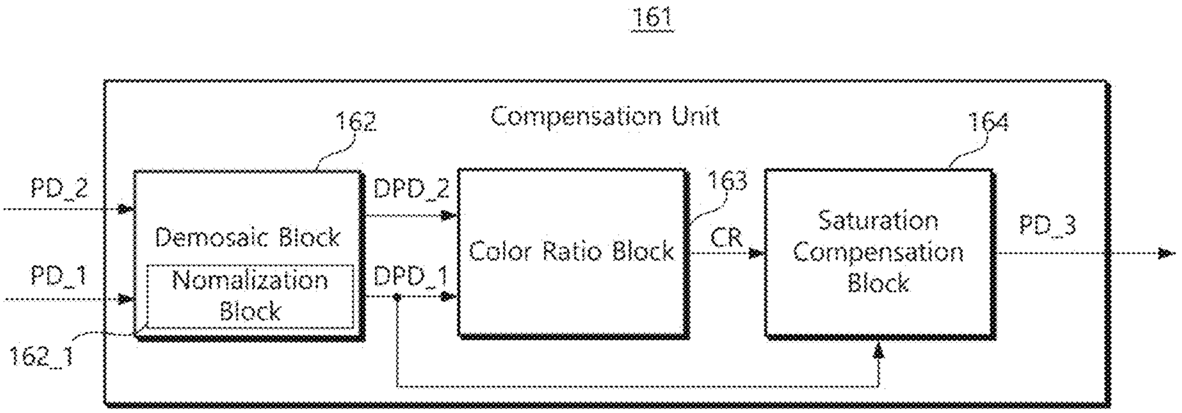
FIG. 9 is a block diagram of a compensation unit according to one or more example embodiments.

FIG. 9 is a block diagram of a compensation unit according to one or more example embodiments. The compensation unit of FIG. 9 may correspond to the compensation unit 161 of FIG. 7. The compensation unit 161 will now be described with reference to FIGS. 9, 10, and 11.

The compensation unit 161 may include a demosaic block 162, a color ratio block 163, and a saturation compensation block 164.

The demosaic block 162 may receive first pixel data PD_1 and second pixel data PD_2.

The first pixel data PD_1 may be pixel data based on a high conversion gain HCG or a long exposure time. The second pixel data PD_2 may be pixel data based on a low conversion gain LCG or a short exposure time. Each of the first pixel data PD_1 and the second pixel data PD_2 may be pixel data having a mosaic pattern based on the color filter array of the pixel array 110 of FIG. 1.

In an example embodiment, the demosaic block 162 may include a normalization block 162_1 normalizing the second pixel data PD_2. The second pixel data PD_2 may be normalized based on the first pixel data PD_1. For example, each intensity value of the second pixel data PD_2 may be amplified by a ratio of the high conversion gain HCG to the low conversion gain LCG (HCG/LCG). In another example embodiment, the second pixel data PD_2 may be normalized based on a dynamic range of the intensity values of the first pixel data PD_1.

In an example embodiment, the demosaic block 162 may perform demosaicing and low-pass filtering on the first pixel data PD_1 and the second pixel data PD_2. The demosaic block 162 may perform demosaicing on each color channel. For example, each demosaicing convolution filter and blur convolution filter associated with a color channel may be convolved with the pixel data PD for each color filter. For example, referring to FIG. 10, a demosaicing convolution filters DMSC and a blur convolution filters BLUR for each color channel may be convoluted with pixel data PD stored in a plurality of line memories. The demosaicing convolution filter DMSC and the blur convolution filter BLUR, associated with the first color channel, may be convolved with a pixel PX_A of the pixel data PD to generate a pixel PX_B. In an example embodiment, demosaicing and low-pass filtering may be simultaneously performed on a single convolution filter DMSC*BLUR.

Figure 10:
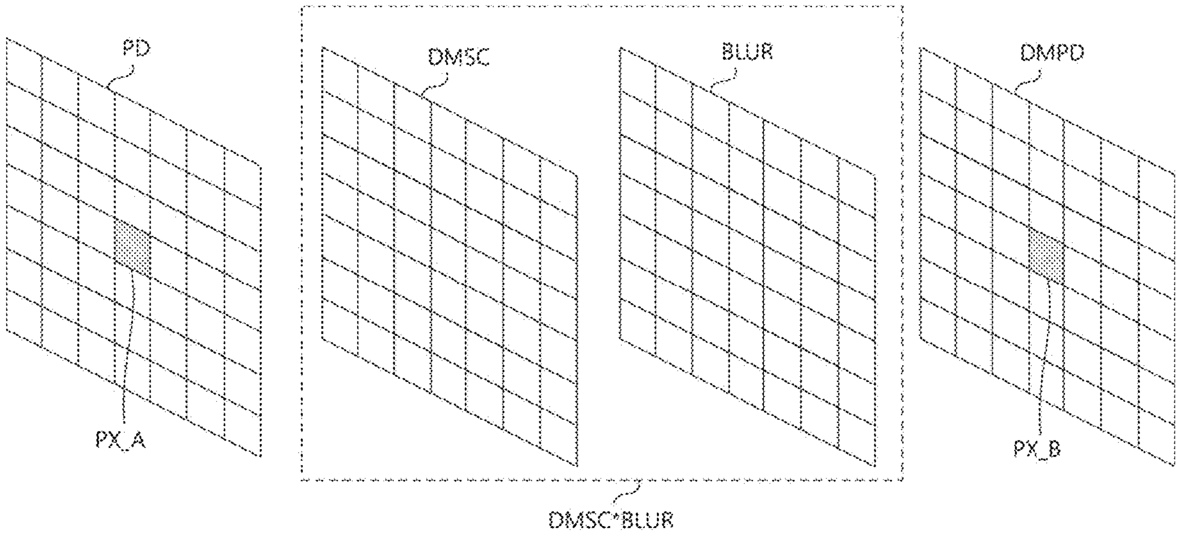
FIG. 10 is a conceptual diagram illustrating the operation of a demosaic block according to one or more example embodiments.
Figure 11:
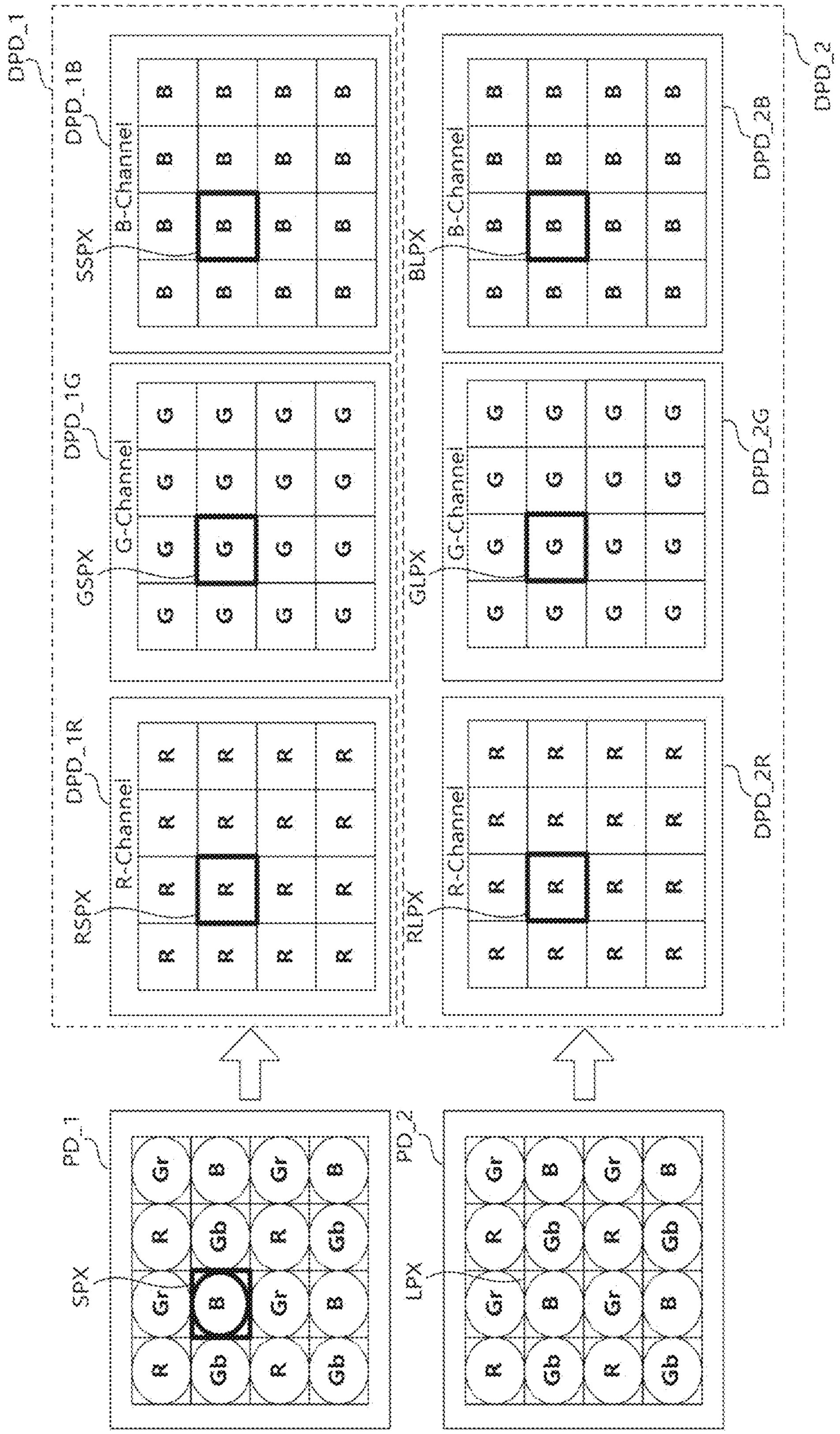
FIG. 11 is a conceptual diagram illustrating a process of determining a color ratio by an image color ratio block according to one or more example embodiments.

Referring to FIG. 10, the demosaic block 162 may convolve the first pixel data PD_1 with a demosaicing convolution filter DMSC and a blur convolution filter BLUR according to each color channel, as illustrated in FIG. 11, and generate pixel data DPD_1R of a red color channel that is a first color channel, pixel data DPD_1G of a green color channel that is a second color channel, and pixel data DPD_1B of a blue color channel that is a third color channel. In an example embodiment, coefficients of the demosaicing convolution filters DMSC and the blur convolution filters BLUR may be different from each other for each color channel. An example is provided in which a saturated pixel SPX of the first pixel data PD_1 is associated with the blue color channel. However, the disclosure is not limited thereto, and as such, according to another embodiment, a saturated pixel SPX of the first pixel data PD_1 may be associated with a red color channel or a green color channel. The demosaicing block 162 may also convolve the demosaicing convolution filter DMSC and the blur convolution filter BLUR according to each color channel, as illustrated in FIG. 11, with the second pixel data PD_2, and generate pixel data DPD_2R of the red color channel that is the first color channel, pixel data DPD_2G of the green color channel that is the second color channel, and pixel data DPD_2B of the blue color channel that is the third color channel. A range of intensity values of the first pixel data PD_1 may be higher than a range of intensity values of the second pixel data PD_2. For example, the first pixel data PD_1 may be pixel data based on a high conversion gain HCG or a long exposure time. The second pixel data PD_2 may be pixel data based on a low conversion gain LCG or a short exposure time.

Referring to FIG. 11, the color ratio block 163 may receive demosaiced first pixel data DPD_1 and normalized demosaiced second pixel data DPD_2. The demosaiced first pixel data DPD_1 may include pixel data DPD_1R, DPD_1G, and DPD_1B according to each color channel. The normalized demosaiced second pixel data DPD_2 may include pixel data DPD_2R, DPD_2G, and DPD_2B according to each color channel.

The color ratio block 163 may determine at least one color ratio based on the demosaiced first pixel data DPD_1 and the demosaiced second pixel data DPD_2, each of which has been demosaiced.

A color ratio CR may include at least one color ratio between a plurality of color channels corresponding to a color filter array. For example, a saturated pixel of the first pixel data PD_1 may be associated with the third color channel, and the color filter array may include a color filter of the first color channel, a color filter of the second color channel, and a color filter of the third color channel. A color ratio may include at least one of a first color ratio, which is a color ratio of the third color channel to the first color channel, and a second color ratio which is a color ratio of the third color channel to the second color channel.

For example, a color ratio for restoring the saturated pixel SPX of the first pixel data PD_1 of FIG. 11 may include at least one of the first color ratio and the second color ratio.

The first color ratio may be an intensity value of the first subpixel RSPX of the red color channel DPD_1R, which is the first color channel of the demosaiced first pixel data DPD_1, and an intensity value of the third subpixel BLPX of the blue color channel DPD_2B, which is the third color channel of the normalized demosaiced second pixel data DPD_2. The intensity value of the first subpixel RSPX and the intensity value of the third subpixel BLPX may be intensity values after performing low-pass filtering on the first subpixel RSPX and the third subpixel BLPX, respectively.

The second color ratio may be an intensity value of the second subpixel GSPX of the green color channel DPD_1G, which is the second color channel of the demosaiced first pixel data DPD_1, and an intensity value of the third subpixel BLPX of the blue color channel DPD_2B, which is the third color channel of the normalized demosaiced second pixel data DPD_2. The intensity value of the second subpixel GSPX and the intensity value of the third subpixel BLPX may be intensity values after performing low-pass filtering on the second subpixel GSPX and the third subpixel BLPX, respectively.

The color ratio CR may be different for each saturated pixel of the first pixel data PD_1. In an example case in which the first pixel and the second pixel of the first pixel data PD_1 are saturated and the first pixel and the second pixel are associated with the same first color channel, a first color ratio of the first pixel and a first color ratio of the second pixel may be different from each other. Referring to FIG. 11, the first subpixel RSPX and the second subpixel GSPX, which are pixels corresponding to the saturated pixel SPX for restoring the saturated pixel SPX, may be used. For example, subpixels corresponding to a saturated pixel of the first pixel data PD_1 may be used to calculate a color ratio. Accordingly, color ratios used to restore saturated pixels may be different from each other.

The saturation compensation block 164 may generate third pixel PD_3, in which at least a portion of the saturated pixels of the first pixel data PD_1 has been restored, based on the color ratio CR and the demosaiced first pixel data DPD_1 that has been demosaiced. For example, the saturation compensation block 164 may restore saturated pixels using Equation 1 and/or Equation 2, as described with reference to FIG. 8.

The saturation compensation block 164 may restore saturated pixels SPX of the first pixel data PD_1 based on the color ratio. For example, referring to FIG. 11, the saturation compensation block 164 may restore the blue subpixel SSPX, which is a subpixel of a color channel associated with the blue pixel that is the saturated pixel SPX, based on the color ratio. The saturation compensation block 164 may use the first color ratio and the second color ratio described with reference to FIG. 11. The saturation compensation block 164 may restore the blue subpixel SSPX by applying the first color ratio, the second color ratio, the intensity value of the first subpixel RSPX of the red color channel DPD_1R that is the first color channel, and the intensity value of the second subpixel GSPX of the green color channel DPD_1G that is the second color channel to Equation 2, as described with reference to FIG. 11.

Figure 12:
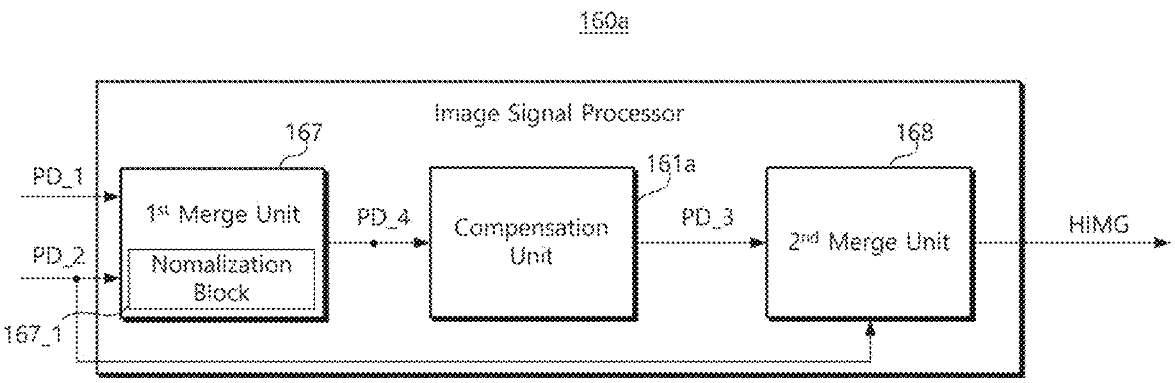
FIG. 12 is a block diagram of an image signal processor according to one or more example embodiments.

FIG. 12 is a block diagram of an image signal processor 160*a* according to one or more example embodiments.

The image signal processor of FIG. 12 may correspond to the image signal processor 160 of FIG. 1. The image signal processor 160 will now be described with reference to FIGS. 12 and 13. With regard to sections that are similar or redundant to those described in FIGS. 7 to 11, a detailed description will be omitted.

An image signal processor 160*a* according to an example embodiment may include a first merge unit 167, a compensation unit 161*a*, and a second merge unit 168.

The first merge unit 167 may receive first pixel data PD_1 and second pixel data PD_2, and may provide fourth pixel data PD_4 to the compensation unit 161*a*. For example, the first merge unit 167 may output the fourth pixel data PD_4 by merging the first pixel data PD_1 and the second pixel data PD_2 into a single piece of data.

In an example embodiment, noise removal processing may be performed on the fourth pixel data PD_4. For example, unlike the embodiment described with reference to FIG. 7, noise removal processing may be performed after the first pixel data PD_1 and the second pixel data PD_2 are merged. Accordingly, a line memory required to separately maintain the first pixel data PD_1 and the second pixel data PD_2 may be reduced. In addition, there is no need to synchronize the first pixel data PD_1 and line delay for noise removal processing of the second pixel data PD_2, so that a circuit may be simplified. In addition to noise removal processing, processing for improving image quality may be performed on the fourth pixel data PD_4 in which the first pixel data PD_1 and the second pixel data PD_2 are merged.

The compensation unit 161*a* may receive the fourth pixel data PD_4 in which the first pixel data PD_1 and the second pixel data PD_2 are merged, and may output third pixel data PD_3 in which pixel data of saturated pixels in the fourth pixel data PD_4 is restored. The saturated pixels in the fourth pixel data PD_4 may correspond to saturated pixels in the first pixel data PD_1. The compensation unit 161*a* may generate first pixel data PD_1 from the fourth pixel data PD_4 to restore saturated pixels. The compensation unit 161*a* may demosaic and low-pass filter the fourth pixel data PD_4, and may demosaic the first pixel data PD_1. The compensation unit 161*a* is described in detail below with reference to FIGS. 14 and 15.

The second merge unit 168 may merge the restored third pixel data PD_3 and the second pixel data, in which saturated pixels are restored, to generate HDR image data HIMG. The second merge unit 168 may operate in the same manner as the merge unit 166 described with reference to FIG. 7.

Figure 13:
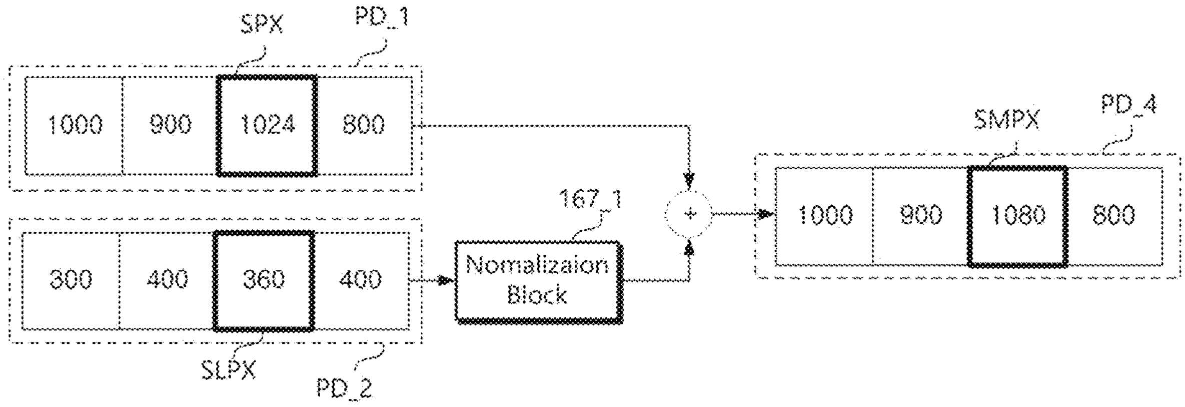
FIG. 13 is a conceptual diagram illustrating the operation of a merging unit according to one or more example embodiments.

FIG. 13 is a conceptual diagram illustrating the operation of the first merge unit 167 according to the example embodiment of FIG. 12.

Referring to FIG. 13, the second pixel data PD_2 may be normalized by the normalization block 167_1 before merging is performed. In an example case in which the first pixel data PD_1 is pixel data based on a high conversion gain HCG and the second pixel data PD_2 is pixel data based on a low conversion gain LCG, each intensity value of the second pixel data PD_2 may be amplified by a ratio of the high conversion gain HCG to the low conversion gain LCG (HCG/LCG).

In an example embodiment, referring to FIG. 13, the first merge unit 167 may replace pixel data of a saturated pixel SPX of first pixel data PD_1 with pixel data of normalized second pixel data PD_2. In an example case in which pixel data is 10 bits of data, the first merge unit 167 may replace an intensity value of the first pixel data PD_1 having an intensity value of 1024 in the saturated pixel SPX with the pixel data of the second pixel data PD_2. The first merge unit 167 may replace the intensity value of the saturated pixel SPX using the pixel data of the pixel SLPX of the second pixel data PD_2 corresponding to the saturated pixel SPX. Accordingly, the fourth pixel data PD_4 may be pixel data in which the intensity value of a saturated pixel SPX of the first pixel data PD_1 is replaced with an intensity value of a corresponding pixel SLPX of the normalized second pixel data PD_2.

The compensation unit 161*a* according to the example embodiment of FIG. 12 will now be described with reference to FIG. 14.

The compensation unit 161*a* may include a demosaic block 162*a*, a color ratio block 163, and a saturation compensation block 164.

The demosaic block 162*a* may receive fourth pixel data PD_4 from the first merge unit 167 of FIG. 12. The fourth pixel data PD_4 may be pixel data in which the first pixel data PD_1 and the second pixel data PD_2 are merged, as illustrated in FIG. 13.

The demosaic block 162*a* may include a first pixel data generator 162*a*_1. The first pixel data generator 162*a*_1 may generate first pixel data PD_1 based on fourth pixel data PD_4. In an example case in which pixel data is 10 bits of data, the first pixel data generator 162*a*_1 may generate first pixel data PD_1, as a plurality of pieces of pixel data having an intensity value of less than 1024, from the fourth pixel data PD_4.

The demosaic block 162*a* may demosaic and/or low-pass filter (e.g., perform low-pass filter operation on) the generated first pixel data PD_1 and the fourth pixel data PD_4, respectively. For example, the demosaic block 162*a* may demosaic the first pixel data PD_1 to generate demosaiced first pixel data DPD_1, and may demosaic and low-pass filter the fourth pixel data PD_4 to generate demosaiced fourth pixel data DPD_4. The demosaic block 162*a* may provide the demosaiced first pixel data DPD_1 to the saturation compensation block 164 and the demosaiced fourth pixel data DPD_4 to a color ratio block 163.

The color ratio block 163 may calculate at least one color ratio CR as described with reference to FIG. 11, and may provide the calculated at least one color ratio CR to a saturation compensation block 164.

The saturation compensation block 164 may generate third pixel data PD_3, in which a saturated pixel of the demosaiced first pixel data DPD_1 is restored, based on the at least one color ratio CR and the demosaiced first pixel data DPD_1, as described with reference to FIG. 11.

Figure 14:
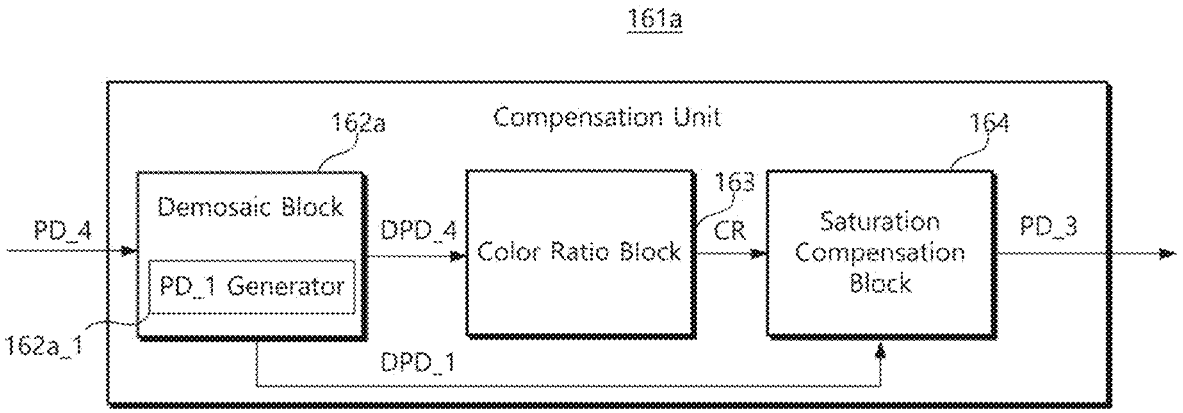
FIG. 14 is a block diagram of a compensation unit according to one or more example embodiments.
Figure 15:
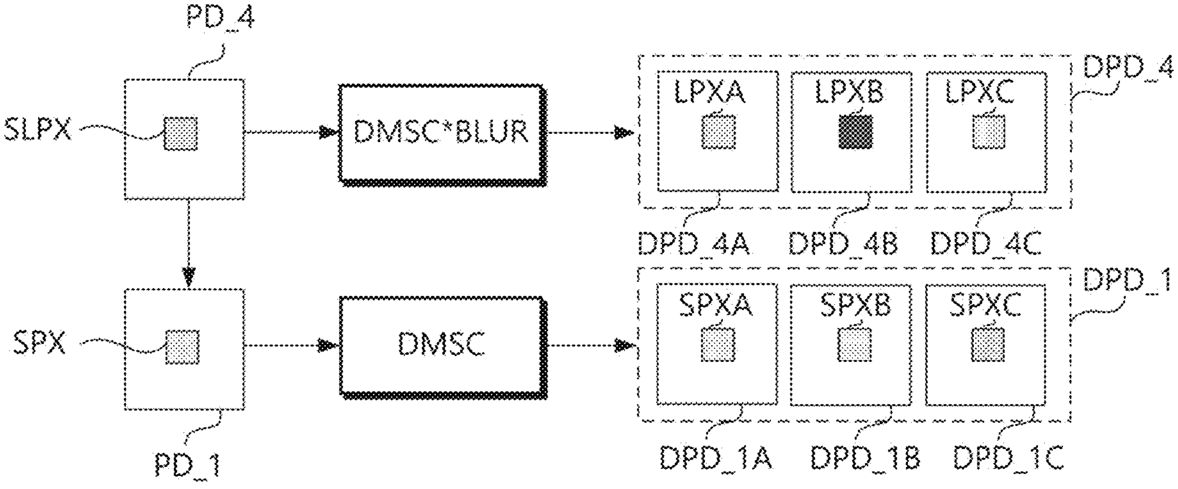
FIG. 15 is a conceptual diagram illustrating the operation of a demosaic block illustrated in FIG. 14.

FIG. 15 is a conceptual diagram illustrating the operation of the demosaic block 162*a* according to the example embodiment of FIG. 14.

In an example embodiment, the demosaic block 162*a* may perform demosaicing and low-pass filtering on the fourth pixel data PD_4. For example, similarly to the illustration in in FIG. 11, a demosaic convolution filter and a low-pass convolution filter associated with each color channel may be convoluted with the fourth pixel data PD_4. In an example embodiment, the low-pass convolution filter may be a blur convolution filter.

The demosaic block 162*a* may perform demosaicing on the first pixel data PD_1. For example, similarly to the illustration in FIG. 11, a demosaic convolution filter associated with each color channel may be convoluted with the first pixel data PD_1.

The fourth pixel data PD_4 may include pixel data of pixels SLPX, replaced with a normalized value of the second pixel data PD_2, of the saturated pixels SPX of the first pixel data, as described in FIG. 13. The demosaiced fourth pixel data DPD_4 may include a first color channel DPD_4A, a second color channel DPD_4B, and a third color channel DPD_4C. An example is provided in which the first color channel DPD_4A is a color channel associated with the saturated pixel SPX. Each of the color channels DPD_4A, DPD_4B, and DPD_4C of the demosaiced fourth pixel data DPD_4 may include subpixels LPXA, LPXB, and LPXC corresponding to the saturated pixel SPX.

The demosaiced first pixel data DPD_1 may include a first color channel DPD_1A, a second color channel DPD_1B, and a third color channel DPD_1C. An example is provided in which the first color channel DPD_1A is a color channel associated with the saturated pixel SPX. Each of the color channels DPD_1A, DPD_1B, and DPD_1C of the demosaiced first pixel data DPD_1 may include subpixels SPXA, SPXB, and SPXC corresponding to the saturated pixel SPX.

The color channels DPD_4A, DPD_4B, and DPD_4C of the demosaiced fourth pixel data DPD_4 may be provided to the color ratio block 163. The color channels DPD_1A, DPD_1B, and DPD_1C of the demosaiced first pixel data DPD_1 may be provided to the saturation compensation block 164.

The color ratio block 163 may determine at least one color ratio CR based on the color channels DPD_4A, DPD_4B, and DPD_4C of the fourth pixel data DPD_4.

In an example, the first color channel DPD_4A is a color channel associated with a saturated pixel, so that the pixel LPXA of the first color channel DPD_4A of the fourth pixel data DPD_4 may be a pixel in which a saturated pixel of the first pixel data PD_1 is replaced with a normalized value of the second pixel data PD_2. The second color channel DPD_4B and the third color channel DPD_4C of the fourth pixel data DPD_4 may be unsaturated color channels, so that the pixels LPXB and LPXC corresponding to saturated pixels SPX may be pixels demosaiced from unsaturated pixels of the first pixel data PD_1.

Accordingly, the first color ratio that is a ratio of the first color channel to the second color channel may be calculated as an intensity value of the pixel LPXA to an intensity value of the pixel LPXB. In addition, the second color ratio that is a ratio of the first color channel to the third color channel may be calculated as an intensity value of the pixel LPXA to an intensity value of the pixel LPXC.

Figure 16:
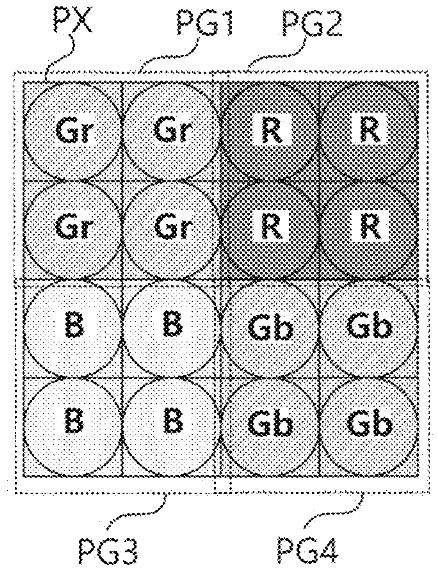
FIG. 16 is a diagram illustrating pixels of an image sensor according to one or more example embodiments.

FIG. 16 is a diagram illustrating pixels of an image sensor according to one or more example embodiments. The pixels described with reference to FIG. 16 may correspond to the pixels PXs of the image sensor 100 of FIG. 1. The pixels PXs will now be described with reference to FIGS. 1 and 16.

In an example embodiment, the pixel array 110 may be a pixel array in which pixels PXs having the same color filter are contiguously arranged. Pixels including the same color filter may be referred to as a pixel group. The pixels PXs of FIG. 16 may be arranged in a tetra-cell structure. An example, in which four pixels having color filters of the same color constitute a single pixel group, is described. A first pixel group PG1 and the fourth pixel group PG4 may include a green color filter, a second pixel group PG2 may include a red color filter, and a third pixel group PG3 may include a blue color filter. For example, the pixel groups PG1, PG2, PG3, and PG4 may be arranged in a Bayer pattern. The pixel groups PG1, PG2, PG3, and PG4, which are the same as illustrated in FIG. 16, may be repeatedly arranged in the pixel array 110.

The image sensor 100 including the pixel array 110 according to the example embodiment of FIG. 16 may operate in tetra mode or normal mode.

In normal mode, the pixel array 110 may output a pixel signal, which is an analog signal, from each of the pixels included in the pixel groups PG1, PG2, PG3, and PG4.

In an example embodiment, in tetra mode, the pixel array 110 may output a pixel signal, which is an analog signal, for each of the pixel group PG1, PG2, PG3, and PG4 rather than outputting an analog signal from each pixel. For example, the pixel array 110 may operate in units of pixel groups. For example, pixels included in the same pixel group may be controlled in the same manner, and signals output from the pixels included in the same pixel group may be binned. In tetra mode, the readout circuit 150 may output first pixel data and second pixel data. The image signal processor 160 may restore pixel data of a saturated pixel group from first pixel data of the pixel groups PG1, PG2, PG3, and PG4 operating in tetra mode. The image signal processor 160 may restore at least a portion of the pixel data of the saturated pixel group of the first pixel data based on the second pixel data and at least one color ratio.

In an example embodiment, a pixel group may include pixels in the form of M*N (where M and N are integers greater than or equal to 2). The form of M*N may be a form in which M pixel lines are arranged in a vertical direction. Each of the M pixel lines may include N pixels arranged contiguously in a horizontal direction. In the example embodiment described with reference to FIG. 12, M and N are 2, but example embodiments are not limited thereto and M and N may be 3 or more. In addition, M and N may be integers different from each other.

Figure 17:
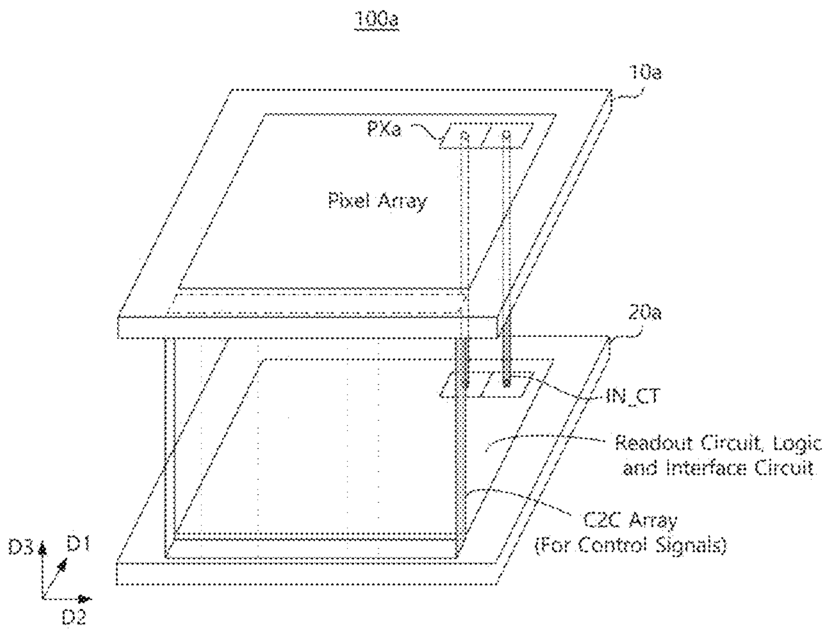
FIG. 17 is a block diagram of an image sensor according to one or more example embodiments.

FIG. 17 is a block diagram of an image sensor 100*a* according to one or more example embodiments. With regard to redundant sections, a detailed description will be omitted.

The image sensor 100*a* may include a first substrate 10*a* and a second substrate 20*a*, which are stacked. The first substrate 10*a* and the second substrate 20*a* may be connected to each other through a wafer bonding process using a pixel-level C2C interconnection. The first substrate 10*a* and the second substrate 20*a* may be electrically connected not only through in-pixel contacts IN_CT inside a pixel PXa but also through a Cu-to-Cu (C2C) array provided in a peripheral region of a substrate. Control signals for controlling pixel circuits may be transmitted through the C2C array. The pixel signal or pixel data of the first substrate 10*a* may be transmitted to the readout circuit or image signal processor of the second substrate 20*a* through the in-pixel contact IN_CT.

Figure 18:
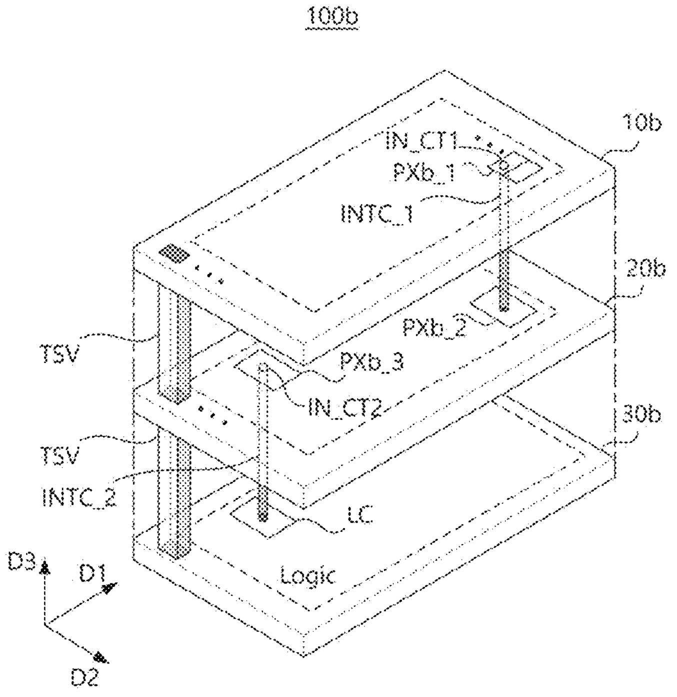
FIG. 18 is a block diagram of an image sensor according to one or more example embodiments.

FIG. 18 is a block diagram of an image sensor 100*b* according to one or more example embodiments. With regard to redundant sections, a detailed description will be omitted.

Referring to FIG. 18, the image sensor 100*b* may include a first substrate 10*b*, a second substrate 20*b*, and a third substrate 30*b*. The third substrate 30*b*, the second substrate 20*b*, and the first substrate 10*b* may be sequentially stacked in a direction D3, perpendicular to a plane of a substrate (a surface parallel to D1 and D2).

In an example embodiment, pixel circuits PXb_1, PXb_2, and PXb_3 may be formed on the first substrate 10*b* and the second substrate 20*b*, respectively. Among the pixel circuits PXb_1, PXb_2, and PXb_3, a first portion circuit PXb_1 may be provided on the first substrate 10*b*, and second portion circuits (remaining circuits) PXb_2 and PXb_3 may be provided on the second substrate 20*b*. The third substrate 30*b* may include logic, such as a readout circuit, a timing controller, or an image signal processor, and an interface circuit. The readout circuit may include an analog-to-digital converter (ADC).

For example, a photodiode and a transfer transistor may be provided on the first substrate 10*b*, and the remaining pixel circuits may be provided on the second substrate 20*d*.

A form, in which circuits constituting pixels are provided on the first substrate 10*b* and the second substrate 20*b*, is not limited thereto.

The first substrate 10*b* and the second substrate 20*b* may be electrically connected to each other.

In an example embodiment, the first substrate 10*b* and the second substrate 20*b* may a transmit pixel signal or a control signal through a through-silicon via (TSV) provided in a peripheral region of the substrate.

In an example embodiment, the first portion circuit PXa_1 on the first substrate 10*b* and the second portion circuit PXb_2 on the second substrate 20*b* may also be electrically connected through a first inter-substrate connection structure INTC1. The inter-substrate connection structure INTC1 may be a Cu-to-Cu (C2C) bonding contact or a deep-contact structure. The deep-contact structure may include a through-silicon via. The inter-substrate connection structure INTC_1 may electrically connect an in-pixel contact IN_CT1, electrically connected to an element of the first portion circuit PXa_1, and an in-pixel contact IN_CT2 electrically connected to an element of the second portion circuit PXb_2.

In an example embodiment, the first substrate 10*b* and/or the second substrate 20*b* may be electrically connected to the third substrate 30*b* through a through-silicon via TSV and/or a second inter-substrate connection structure INTC_2. A signal of the first substrate 10*b* and/or the second substrate 20*b* may be transmitted to a readout circuit (or an image signal processor) of the third substrate 30*b* through the through-silicon via TSV and/or the second inter-substrate connection structure INTC_2.

In an example embodiment, the second portion circuit PXb_2 may be electrically connected to circuits of the third substrate 30*b* through a Cu-to-Cu (C2C) bonding contact. The second inter-substrate connection structure INTC_2 may include a Cu-to-Cu (C2C) bonding contact.

In an example embodiment, the third portion circuit PXb_3 may be electrically connected to circuits of the third substrate 30*b* through through-silicon copper (TSC).

Figure 19:
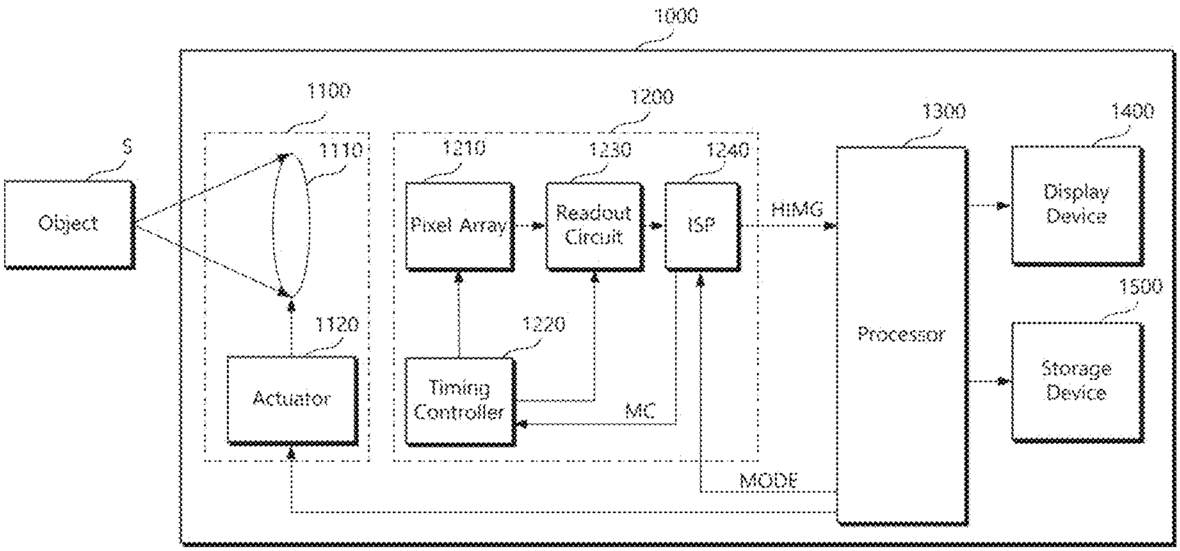
FIG. 19 is a block diagram of an electronic device according to one or more example embodiments.

FIG. 19 is a block diagram of an electronic device according to one or more example embodiments. With regard to redundant sections, a detailed description will be omitted.

An electronic device 1000 may include a capturing unit 1100, an image sensor 1200, a processor 1300, a display device 1400, and a storage device 1500.

The processor 1300 may control the overall operation of the electronic device 1000. The processor 1300 may provide a control signal to a lens driver (actuator) 1120 to control a location of the lens 1110. As a result, a focal length may be controlled.

The capturing unit 1100 may include a lens 1110 and the actuator 1120 as light-receiving components. The lens 1110 may include a plurality of lenses.

The actuator 1120 may move the lens 1110 in a direction in which a distance from an object S increases or decreases, based on the control signal from the processor 1300.

The image sensor 1200 may generate image data and phase data based on incident light. The image sensor 1200 may include a pixel array 1210, a timing controller 1220, a readout circuit 1230, and an image signal processor (ISP) 1240.

The pixels of the pixel array 1210 may include at least one photoelectric conversion element.

Pixels of the pixel array 1210 according to an example embodiment may operate in normal mode or HDR mode. The image signal processor 1240 may generate a mode control signal MC based on a capturing mode signal MODE transmitted by the processor 1300. The pixels may operate in either normal mode or HDR mode based on the mode control signal MC transmitted by the image signal processor 1240.

The processor 1300 may provide the mode control signal MC to the timing controller 1220. The timing controller 1220 may control the operation of the pixel array 1210 based on the mode control signal MC.

In an example case in which the pixels of the pixel array 1210 operate in HDR mode, the processor 1300 may generate an image signal based on an HDR image data HIMG provided by the image sensor 1200, and display the image signal on the display device 1400 or store the image signal in the storage device 1500.

In an example case in which the image sensor 1200 provides first pixel data based on long exposure and second pixel data based on short exposure to the processor 1300 as HDR image data HIMG, the processor 1300 may combine the first pixel data and the second pixel data to generate a single image signal. At least a portion of saturated pixels in the first pixel data may be pixel data restored based on the second pixel data and a color ratio.

Figure 20:
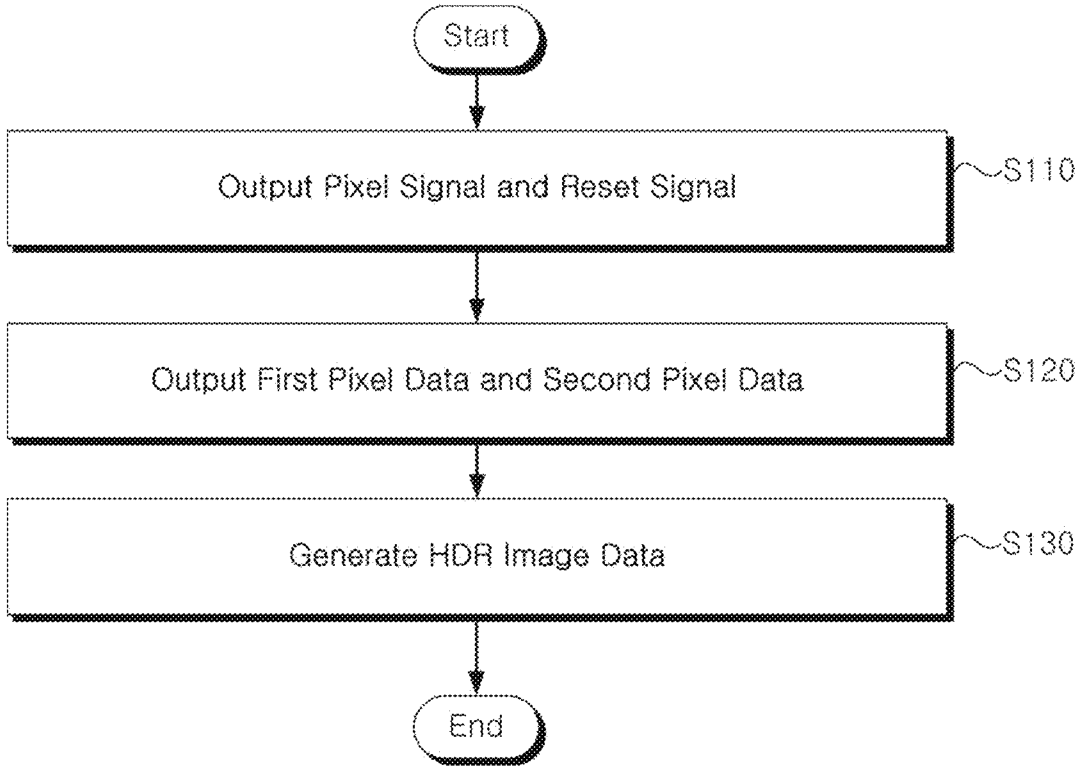
FIG. 20 is a flowchart illustrating a method of operating an image sensor according to one or more example embodiments.

In an example case in which the image sensor 1200 provides third pixel data, in which is the first pixel data and the second pixel data are combined into a single piece of data, as HDR image data HIMG, the processor 1300 may display the third pixel data on the display device 1400 as an image signal or store the third pixel data in the storage device 1500. At least a portion of the third pixel data may be pixel data obtained by restoring saturated pixel data of the first pixel data based on a high conversion gain HCG output by the readout circuit 1230, based on the second pixel data based on a low conversion gain LCG and the color ration FIG. 20 is a flowchart illustrating a method of operating an image sensor according to one or more example embodiments. With regard to redundant sections, a detailed description will be omitted. A method of operation the image sensor of FIG. 20 may be performed by the image sensor 100 of FIG. 1.

In operation S110, the method may include outputting a pixel signal and a reset signal. For example, a plurality of pixels PXs of the pixel array 110 of the image sensor 100 may output a pixel signal and a reset signal.

Each of the pixels PXs may operate in normal capturing mode or HDR mode.

In an example case in which the image sensor 100 operates in HDR mode based on exposure time, the pixels PXs may output a first pixel signal corresponding to first exposure time, and then output a second pixel signal corresponding to second exposure time. The first exposure time and the second exposure time may be different from each other. The first exposure time may be longer or shorter than the second exposure time.

In an example case in which the image sensor 100 operates in HDR mode based on a conversion gain, the pixels PXs may output the first pixel signal and a first reset signal based on a high conversion gain, and output the second pixel signal based on a low conversion gain LCG.

In operation S120, the method may include outputting first pixel data and second pixel data based on the pixel signal and the reset signal. For example, the readout circuit may output first pixel data and second pixel data based on the pixel signal and the reset signal.

In operation S130, the method may include determining a color ratio between color channels of the first pixel data, and generating third pixel data by restoring at least a portion of saturated pixel data of the first pixel data based on the color ratio. For example, the image signal processor may determine a color ratio between color channels of the first pixel data, and generate third pixel data by restoring at least a portion of saturated pixel data of the first pixel data based on the color ratio. The image signal processor may output HDR image data based on the second pixel data and the third pixel data. At least a portion of the first pixel data may have a higher intensity value than the second pixel data.

As described above, according to one or more example embodiments, an image sensor may improve a signal-to-noise ratio (SNR) of an HDR image.

While example embodiments have been shown and described above, it will be apparent to those skilled in the art that modifications and variations could be made without departing from the scope of the present inventive concept as defined by the appended claims.

What is claimed is:

1. An image sensor comprising:

a pixel array comprising a plurality of pixels;

a readout circuit configured to output first pixel data and second pixel data based on an output signal of the pixel array; and an image signal processor configured to:

generate third pixel data by restoring at least a portion of saturated pixel data of the first pixel data based on the second pixel data, and output high dynamic range (HDR) image data based on the second pixel data and the third pixel data, wherein a portion of the first pixel data has a higher intensity value than the second pixel data.

2. The image sensor of claim 1, wherein the first pixel data corresponds to a first exposure time and the second pixel data corresponds to a second exposure time, and wherein the first exposure time is longer than the second exposure time.

3. The image sensor of claim 1, wherein the first pixel data corresponds to a first conversion gain and the second pixel data corresponds to a second conversion gain, and wherein the first conversion gain is higher than the second conversion gain.

4. The image sensor of claim 3, wherein:

the pixel array is configured to output a first pixel signal and a second pixel signal based on light exposure of the plurality of pixels at a same time period, and the readout circuit is configured to:

output the first pixel data based on the first pixel signal, and output the second pixel data based on the second pixel signal.

5. The image sensor of claim 3, wherein the pixel array is configured to:

output a first pixel signal and a first reset signal associated with the first pixel signal, and output a second pixel signal and a second reset signal associated with the second pixel signal, and wherein the readout circuit is configured to:

output the first pixel data based on the first pixel signal and the first reset signal, and output the second pixel data based on the second pixel signal and the second reset signal.

6. The image sensor of claim 1, wherein:

each of the first pixel data and the second pixel data is pixel data having a mosaic pattern based on a color filter array of the plurality of pixels, and the image signal processor is further configured to:

obtain at least one color ratio between a plurality of color channels corresponding to the color filter array based on the first pixel data and the second pixel data, and generate the third pixel data by restoring the at least a portion of the saturated pixel data of the first pixel data based on the at least one color ratio and the second pixel data.

7. The image sensor of claim 6, wherein the at least one color ratio is different for each of a plurality of saturated pixel data of the first pixel data.

8. The image sensor of claim 6, wherein:

the plurality of color channels comprises a first color channel, a second color channel, and a third color channel, the plurality of saturated pixel data of the first pixel data comprises first saturated pixel data of a first subpixel, the first subpixel is a pixel associated with the first color channel, the image signal processor is further configured to restore the pixel data of the first subpixel based on at least one of a first color ratio and a second color ratio corresponding to the first subpixel, and the first color ratio is a ratio of the first color channel to the second color channel, and the second color ratio is a ratio of the first color channel to the third color channel.

9. The image sensor of claim 8, wherein the image signal processor is further configured to:

demosaic the first pixel data to generate pixel data of a second subpixel associated with the second color channel and pixel data of a third subpixel associated with the third color channel; and restore the pixel data of the first subpixel based on at least one of a first value reflecting the first color ratio to the pixel data of the second subpixel and a second value reflecting the second color ratio to the pixel data of the third subpixel.

10. The image sensor of claim 1, wherein the image signal processor is further configured to:

generate fourth pixel data by demosaicing at least a portion of the first pixel data;

generate fifth pixel data by demosaicing at least a portion of the second pixel data;

obtain at least one color ratio based on the fourth pixel data and the fifth pixel data; and generate the third pixel data by restoring the at least a portion of the saturated pixel data of the first pixel data based on the fourth pixel data and the at least one color ratio, and wherein the at least one color ratio represents a relationship between a plurality of color channels constituting the first pixel data.

11. The image sensor of claim 1, wherein the image signal processor is further configured to:

demosaic the HDR image data, and output the demosaiced HDR image data.

12. The image sensor of claim 1, wherein:

the image signal processor comprises a pre-merge unit configured to:

receive the first pixel data and the second pixel data, and output fourth pixel data merged with the first pixel data, and each of the first pixel data and the second pixel data is pixel data having a mosaic pattern based on a color filter array of the plurality of pixels.

13. The image sensor of claim 12, wherein the image signal processor comprises a compensation unit configured to:

receive the fourth pixel data, and output the third pixel data in which at least a portion of saturated pixel data of the first pixel data is restored.

14. The image sensor of claim 13, wherein the compensation unit comprises:

a color ratio block configured to output at least one color ratio between a plurality of color channels corresponding to the color filter array based on the fourth pixel data, and a saturation restoration block configured to output the third pixel data in which at least a portion of the saturated pixel data of the first pixel data is restored based on the at least one color ratio and the fourth pixel data.

15. The image sensor of claim 14, wherein the color ratio block is configured to:

receive the fourth pixel data, obtain fifth pixel data by demosaicing and blurring the fourth pixel data, and obtain the at least one color ratio based on the fifth pixel data.

16. The image sensor of claim 14, wherein:

the saturation restoration block is further configured to:

receive the at least one color ratio from the color ratio block, the at least one color ratio comprising a first color ratio and a second color ratio, and restore a first subpixel based on at least one of the first color ratio and the second color ratio and at least one of a second subpixel and a third subpixel, the first subpixel, the second subpixel, and the third subpixel correspond to saturated pixel in the plurality of color channels obtained by demosaicing the first pixel data, the plurality of color channels comprise a first color channel, a second color channel, and a third color channel, the first subpixel is a pixel associated with the first color channel, and the first color channel is a color channel associated with the saturated pixel data of the first pixel data, and the first color ratio is a ratio of the first color channel to the second color channel, and the second color ratio is a ratio of the first color channel to the third color channel.

17. An electronic device comprising:

an image sensor configured to output image data based on a pixel signal output from a plurality of pixels; and a processor configured to receive the image data, and output an image based on the image data to a display device or store the image data in a storage device, wherein:

the image sensor comprises:

a readout circuit configured to output first pixel data and second pixel data based on the pixel signal; and an image signal processor configured to:

generate third pixel data by restoring at least a portion of saturated pixel data of the first pixel data based on the second pixel data, and output the HDR image data based on the second pixel data and the third pixel data, a portion of the first pixel data has a higher intensity value than the second pixel data.

18. The electronic device of claim 17, wherein the image senor further comprises:

a pixel array configured to:

output a first reset signal followed by a first pixel signal and output a second pixel signal followed by a second reset signal, based on light exposure of the plurality of pixels at a same time period, and wherein the readout circuit is further configured to:

output the first pixel data based on the first pixel signal and the first reset signal, and output the second pixel data based on the second pixel signal and the second reset signal.

19. The electronic device of claim 17, wherein:

each of the first pixel data and the second pixel data is pixel data having a mosaic pattern based on a color filter array of the plurality of pixels, and the image signal processor is further configured to:

obtain at least one color ratio between a plurality of color channels corresponding to the color filter array based on the first pixel data and the second pixel data, and generate the third pixel data by restoring the at least a portion of the saturated pixel data of the first pixel data based on the at least one color ratio and the second pixel data.

20. A method of operating an image sensor, the method comprising:

outputting, by a pixel array including a plurality of pixels, a pixel signal and a reset signal;

outputting, by a readout circuit, first pixel data and second pixel data based on the pixel signal and the reset signal;

generating third pixel data by restoring at least a portion of saturated pixel data of the first pixel data based on a color ratio between color channels of the first pixel data; and outputting high dynamic range (HDR) image data based on the second pixel data and the third pixel data, wherein a portion of the first pixel data has a higher intensity value than the second pixel data.

* * * * *